United States Patent
Biswas et al.

(10) Patent No.: US 11,551,394 B2
(45) Date of Patent: Jan. 10, 2023

(54) AUDIO-SPEECH DRIVEN ANIMATED TALKING FACE GENERATION USING A CASCADED GENERATIVE ADVERSARIAL NETWORK

(71) Applicant: Tata Consultancy Services Limited, Mumbai (IN)

(72) Inventors: Sandika Biswas, Kolkata (IN); Dipanjan Das, Kolkata (IN); Sanjana Sinha, Kolkata (IN); Brojeshwar Bhowmick, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 176 days.

(21) Appl. No.: 17/199,149

(22) Filed: Mar. 11, 2021

(65) Prior Publication Data
US 2022/0036617 A1   Feb. 3, 2022

(30) Foreign Application Priority Data
Jul. 30, 2020   (IN) .............................. 202021032794

(51) Int. Cl.
*G06T 13/20*   (2011.01)
*G06V 40/16*   (2022.01)
(Continued)

(52) U.S. Cl.
CPC .......... *G06T 13/205* (2013.01); *G06K 9/6256* (2013.01); *G06N 3/0454* (2013.01);
(Continued)

(58) Field of Classification Search
CPC ..... G06T 13/40; G06T 13/205; G06V 40/171; G10L 21/10; G10L 15/02; G10L 25/30; G06N 3/088; G06N 3/0454; G06K 9/6256
See application file for complete search history.

(56) References Cited

U.S. PATENT DOCUMENTS 6,735,566 B1 * 5/2004 Brand .................. G06V 40/176
704/E21.02
10,521,946 B1 * 12/2019 Roche ..................... G10L 13/00
(Continued)

FOREIGN PATENT DOCUMENTS

RU   2720361 C1   4/2020

OTHER PUBLICATIONS

Zakharov, Egor et al., "Few-Shot Adversarial Learning of Realistic Neural Talking Head Models", Computer Vision and Pattern Recognition—Graphics—Machine Learning, Sep. 2019, Arxiv, https://arxiv.org/pdf/1905.08233.pdf.
(Continued)

*Primary Examiner* — Xilin Guo
(74) *Attorney, Agent, or Firm* — Finnegan, Henderson, Farabow, Garrett & Dunner LLP

(57) ABSTRACT

Conventional state-of-the-art methods are limited in their ability to generate realistic animation from audio on any unknown faces and cannot be easily generalized to different facial characteristics and voice accents. Further, these methods fail to produce realistic facial animation for subjects which are quite different than that of distribution of facial characteristics network has seen during training. Embodiments of the present disclosure provide systems and methods that generate audio-speech driven animated talking face using a cascaded generative adversarial network (CGAN), wherein a first GAN is used to transfer lip motion from canonical face to person-specific face. A second GAN based texture generator network is conditioned on person-specific landmark to generate high-fidelity face corresponding to the motion. Texture generator GAN is made more flexible using meta learning to adapt to unknown subject's traits and orientation of face during inference. Finally, eye-blinks are induced in the final animation face being generated.

12 Claims, 17 Drawing Sheets

(51) Int. Cl.
*G06K 9/62* (2022.01)
*G06N 3/04* (2006.01)
*G06N 3/08* (2006.01)
*G10L 15/02* (2006.01)

(52) U.S. Cl.
CPC .......... *G06N 3/088* (2013.01); *G06V 40/171* (2022.01); *G10L 15/02* (2013.01)

(56) References Cited

U.S. PATENT DOCUMENTS

| | | | |
|---|---|---|---|
| 2017/0154457 A1* | 6/2017 | Theobald | G06T 13/80 |
| 2018/0137678 A1* | 5/2018 | Kaehler | G02B 27/0172 |
| 2021/0192824 A1* | 6/2021 | Chen | H04L 51/02 |

OTHER PUBLICATIONS

Sinha, Sanjana et al., "Identity Preserving Realistic Talking Face Generation Using Audio Speech of a User", Computer Vision and Pattern Recognition, May 2020, Arxiv, https://arxiv.org/pdf/2005.12318.pdf.

Yi, Ran et al., "Audio-driven Talking Face Video Generation with Learning-based Personalized Head Pose", Computer Vision and Pattern Recognition, Mar. 2020, Arxiv, https://arxiv.org/pdf/2002.10137.pdf.

Vougioukas, Konstantinos et al., "Realistic Speech-Driven Facial Animation with GANs", Computer Vision and Pattern Recognition—Machine Learning—Audio and Speech Processing, Jun. 2019, Arxiv, https://arxiv.org/pdf/1906.06337.pdf.

* cited by examiner

AUDIO-SPEECH DRIVEN ANIMATED TALKING FACE GENERATION USING A CASCADED GENERATIVE ADVERSARIAL NETWORK

PRIORITY CLAIM

This U.S. patent application claims priority under 35 U.S.C. § 119 to: India Application No. 202021032794, filed on Jul. 30, 2020. The entire contents of the aforementioned application are incorporated herein by reference.

TECHNICAL FIELD

The disclosure herein generally relates to animated talking face generation techniques, and, more particularly, to audio-speech driven animated talking face generation using a cascaded generative adversarial network.

BACKGROUND

Speech-driven facial animation is the process of synthesizing talking faces from the speech input. Such an animation should not only demonstrate accurate lip synchronization, but also contain realistic motion, natural expressions, and realistic texture portraying target-specific facial characteristics. The animation process should also be able to quickly adapt to any unknown faces and speech. Current state-of-the-art methods are limited in their ability to generate realistic animation from audio on unknown faces, and the methods cannot be easily generalized to different facial characteristics and voice accent. Some of the failures can be attributed to the end-to-end learning of the complex relationship between the multiple modalities of speech and the video.

SUMMARY

Embodiments of the present disclosure present technological improvements as solutions to one or more of the above-mentioned technical problems recognized by the inventors in conventional systems. For example, in one aspect, there is provided a processor implemented method for generating audio-speech driven animated talking face using a cascaded generative adversarial network. The method comprises: obtaining, via one or more hardware processors, an audio speech and a set of identity images (SI) of a target individual; extracting, via the one or more hardware processors, one or more DeepSpeech features of the target individual from the audio speech; generating, using the extracted DeepSpeech features, via a first generative adversarial network (FGAN) of the cascaded GAN executed by the one or more hardware processors, a speech-induced motion (SIM) on a sparse representation (SR) of a neutral mean face, wherein the SR of the SIM comprises a plurality of facial landmark points with one or more finer deformations of lips; generating, via the one or more hardware processors, a plurality of eye blink movements from random noise input learnt from a video dataset, wherein the plurality of eye blink movements are generated for each eye based on a sequence of generated displacements of associated facial landmark points of each eye region, and wherein the plurality of eye blink movements comprise a set of eye landmark points with blink motion; replacing one or more eye landmark points of the plurality of facial landmark points with the set of eye landmark points with blink motion to obtain a set of final landmark points, the set of final landmark points comprises (i) the set of eye landmark points with blink motion and (ii) one or more landmark points containing the speech-induced motion; generating, via the one or more hardware processors one or more target-specific landmark points (TSLP) based on (i) the set of final landmark points (FLP) and (ii) an identity landmark obtained from the set of identity images; determining at least one face type as one of a pre-stored face image or a new face image using the set of identity images; and performing, via a second generative adversarial network (SGAN) of the cascaded GAN executed by the one or more hardware processors, based on the at least one determined face type, one of: fine-tuning a meta-trained network (MN) using the set of identity images (SI) and the plurality of facial landmark points extracted from the SI for the target individual to obtain a fine-tuned meta-trained network (FTMTN) and generating, using the one or more target-specific landmark points (TSLP), a meta-learning texture (MLT) via the FTMTN thereof; or generating a meta-learning texture (MLT) using the SI and the one or more target-specific landmark points (TSLP), via a pre-generated fine-tuned meta-trained network (FTMTN), the generated MLT serves as an animated talking face of the target individual.

In an embodiment, the one or more finer deformations of lips are predicted by the first generative adversarial network (FGAN), the one or more finer deformations of lips are indicative of a difference between pronunciation of two or more letters in one or more words comprised in the audio speech.

In an embodiment, the meta-learning texture comprises a plurality of high-fidelity images. In an embodiment, a plurality of individual pixels of the plurality of high-fidelity images are generated using a neighborhood feature of an output of an intermediary layer of the SGAN.

In an embodiment, the speech induced motion is learnt based on (i) a direction of movement of the plurality facial landmark points, (ii) an adversarial loss used for training the FGAN, (iii) a temporal smoothness loss in the plurality facial landmark points, and (iv) a distance loss between one or more predicted facial landmark points and one or more ground-truth facial landmark points.

In another aspect, there is provided a system for generating audio-speech driven animated talking face using a cascaded generative adversarial network. The system comprises: a memory storing instructions; one or more communication interfaces; and one or more hardware processors coupled to the memory via the one or more communication interfaces, wherein the one or more hardware processors are configured by the instructions to: obtain an audio speech and a set of identity images of a target individual; extract one or more DeepSpeech features of the target individual from the audio speech; generate, using the extracted DeepSpeech features, via a first generative adversarial network (FGAN) of the cascaded GAN executed by the one or more hardware processors, a speech-induced motion (SIM) on a sparse representation (SR) of a neutral mean face, wherein the SR of the SIM comprises a plurality of facial landmark points with one or more finer deformations of lips; generate a plurality of eye blink movements from random noise input learnt from a video dataset, wherein the plurality of eye blink movements are generated for each eye based on a sequence of generated displacements of associated facial landmark points of each eye region, and wherein the plurality of eye blink movements comprise a set of eye landmark points with blink motion; replace one or more eye landmark points of the plurality of facial landmark points with the set of eye landmark points with blink motion to obtain a set of final landmark points, the set of final landmark points comprises (i) the set of eye landmark points with blink motion and (ii) one or more landmark points containing the speech-induced motion; generate one or more target-specific landmark points (TSLP) based on (i) the set of final landmark points (FLP) and (ii) an identity landmark obtained from the set of identity images; determine at least one face type as one of a pre-stored face image or a new face image using the set of identity images; and perform, via a second generative adversarial network (SGAN) of the cascaded GAN executed by the one or more hardware processors, based on the at least one determined face type, one of: fine-tuning a meta-trained network (MN) using the set of identity images (SI) and the plurality of facial landmark points extracted from the SI for the target individual to obtain a fine-tuned meta-trained network (FTMTN) and generating, using the one or more target-specific landmark points (TSLP), a meta-learning texture (MLT) via the FTMTN thereof; or generating a meta-learning texture (MLT) using the SI and the one or more target-specific landmark points (TSLP), via a pre-generated fine-tuned meta-trained network (FTMTN), the generated MLT serves as an animated talking face of the target individual.

In an embodiment, the one or more finer deformations of lips are predicted by the first generative adversarial network (FGAN), the one or more finer deformations of lips are indicative of a difference between pronunciation of two or more letters in one or more words comprised in the audio speech.

In an embodiment, the meta-learning texture comprises a plurality of high-fidelity images, and wherein a plurality of individual pixels of the plurality of high-fidelity images are generated using a neighborhood feature of an output of an intermediary layer of the SGAN.

In an embodiment, the speech induced motion is learnt based on (i) a direction of movement of the plurality facial landmark points, (ii) an adversarial loss used for training the FGAN, (iii) a temporal smoothness loss in the plurality facial landmark points, and (iv) a distance loss between one or more predicted facial landmark points and one or more ground-truth facial landmark points.

In yet another aspect, there is provided a computer program product comprising a non-transitory computer readable medium having a computer readable program embodied therein, wherein the computer readable program, when executed on a computing device causes the computing device to generate audio-speech driven animated talking face using a cascaded generative adversarial network by obtaining, via one or more hardware processors, an audio speech and a set of identity images of a target individual; extracting, via the one or more hardware processors, one or more DeepSpeech features of the target individual from the audio speech; generating, using the extracted DeepSpeech features, via a first generative adversarial network (FGAN) of the cascaded GAN executed by the one or more hardware processors, a speech-induced motion (SIM) on a sparse representation (SR) of a neutral mean face, wherein the SR of the SIM comprises a plurality of facial landmark points with one or more finer deformations of lips; generating, via the one or more hardware processors, a plurality of eye blink movements from random noise input learnt from a video dataset, wherein the plurality of eye blink movements are generated for each eye based on a sequence of generated displacements of associated facial landmark points of each eye region, and wherein the plurality of eye blink movements comprise a set of eye landmark points with blink motion; replacing one or more eye landmark points of the plurality of facial landmark points with the set of eye landmark points with blink motion to obtain a set of final landmark points, the set of final landmark points comprises (i) the set of eye landmark points with blink motion and (ii) one or more landmark points containing the speech-induced motion; generating, via the one or more hardware processors one or more target-specific landmark points (TSLP) based on (i) the set of final landmark points (FLP) and (ii) an identity landmark obtained from the set of identity images; determining at least one face type as one of a pre-stored face image or a new face image using the set of identity images; and performing, via a second generative adversarial network (SGAN) of the cascaded GAN executed by the one or more hardware processors, based on the at least one determined face type, one of: fine-tuning a meta-trained network (MN) using the set of identity images (SI) and the plurality of facial landmark points extracted from the SI for the target individual to obtain a fine-tuned meta-trained network (FTMTN) and generating, using the one or more target-specific landmark points (TSLP), a meta-learning texture (MLT) via the FTMTN thereof; or generating a meta-learning texture (MLT) using the SI and the one or more target-specific landmark points (TSLP), via a pre-generated fine-tuned meta-trained network (FTMTN), the generated MLT serves as an animated talking face of the target individual.

In an embodiment, the one or more finer deformations of lips are predicted by the first generative adversarial network (FGAN), the one or more finer deformations of lips are indicative of a difference between pronunciation of two or more letters in one or more words comprised in the audio speech.

In an embodiment, the meta-learning texture comprises a plurality of high-fidelity images, and wherein a plurality of individual pixels of the plurality of high-fidelity images are generated using a neighborhood feature of an output of an intermediary layer of the SGAN.

In an embodiment, the speech induced motion is learnt based on (i) a direction of movement of the plurality facial landmark points, (ii) an adversarial loss used for training the FGAN, (iii) a temporal smoothness loss in the plurality facial landmark points, and (iv) a distance loss between one or more predicted facial landmark points and one or more ground-truth facial landmark points.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
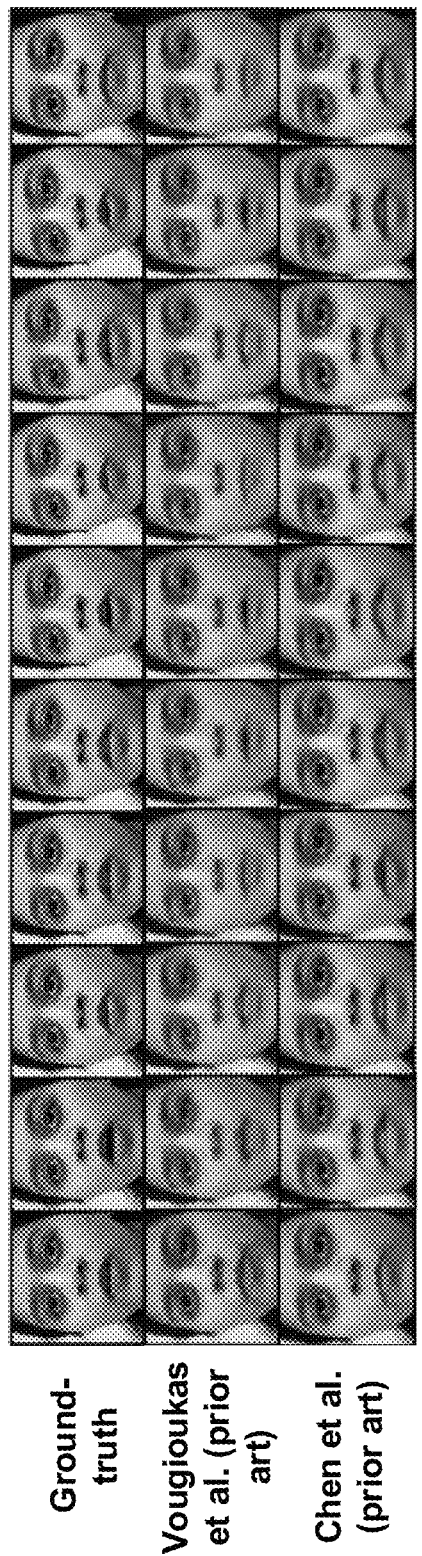
FIG. 1 illustrate state-of-the-art-methods for speech-driven facial animation which fail to capture accurately the mouth shapes and detailed facial texture on an unknown test subject whose facial characteristics differ from the training data.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Speech-driven facial animation is the process of synthesizing talking faces from the speech input. Such an animation should not only demonstrate accurate lip synchronization, but also contain realistic motion, natural expressions, and realistic texture portraying target-specific facial characteristics. The animation process should also be able to quickly adapt to any unknown faces and speech. Current state-of-the-art methods are limited in their ability to generate realistic animation from audio on unknown faces, and the methods cannot be easily generalized to different facial characteristics and voice accent. Some of the failures can be attributed to the end-to-end learning of the complex relationship between the multiple modalities of speech and the video. In the present disclosure, embodiments herein provided a system and methods wherein the problem is partitioned into four steps. Firstly, a Generative Adversarial Network (GAN) is trained to learn the lip motion in a canonical landmark using DeepSpeech features. The use of DeepSpeech features makes the method of the present disclosure invariant to different voices, accent, etc. and the use of canonical face makes the learning invariant to different facial structures. Then, the learned facial motion from the canonical face are transferred to the person-specific face. Next, the present disclosure implements another GAN based texture generator network conditioned on the person-specific landmark to generate high-fidelity face (also referred as high-fidelity image and interchangeably used herein) corresponding to the motion. The present disclosure uses meta learning to make the texture generator GAN more flexible to adapt to the unknown subject's traits and orientation of the face during inference. Finally, eye-blinks are induced in the final animation. The combined result is a significantly improved facial animation from speech than the current state-of-the-art methods. Through experimental results, the present disclosure demonstrates that the method of the present disclosure generalizes well across the different datasets, different languages and accent, and also works reliably well in presence of noises in the speech.

In other words, in the present disclosure, embodiments provide system and method to solve the above-mentioned challenges. In essence, the method of the present disclosure partitions the problem into four stages. First, a GAN network is designed to learn a canonical (person-independent) landmark motion from DeepSpeech features obtained from audio. GAN is powerful to learn the subtle deformations in lips due to speech and learning motion in a canonical face makes the motion invariant to the person-specific face geometry. Along with this DeepSpeech features alleviates the problems due to different accent and noises.

Together all these, the method of the present disclosure is able to learn motion from speech robustly and also is adaptable to the unknown speech. Next, this learned canonical facial landmark motion is transferred to person-specific landmark motion using Procrustes alignment (e.g., for Procrustes alignment refer 'Srivastava, A., Joshi, S. H., Mio, W., Liu, X.: Statistical shape analysis: Clustering, learning, and testing. IEEE Transactions on pattern analysis and machine intelligence 27(4), 590-602 (2005)'—also referred as Srivastava et al.). Subsequently, another GAN network is trained for texture generation conditioning with the person-specific landmark. For better adaptation to the unknown subject and unknown head orientation, this GAN network is meta-learned using Model-Agnostic-Meta-Learning (MAML) algorithm (e.g., refer 'Finn, C., Abbeel, P., Levine, S.: Model-agnostic meta-learning for fast adaptation of deep networks. In: Proceedings of the 34th International Conference on Machine Learning-Volume 70. pp. 1126-1135. JMLR. org (2017)'—also referred as Finn et al.). At test time, the meta-learned model is fine-tuned with few samples to adapt quickly (approx. 100 secs) to the unseen subject.

Eye blinks are imposed using a separate network that learns to generate plausible eye blink motion on facial landmarks.

In contrast, FIG. 1 illustrate state-of-the-art-methods for speech-driven facial animation which fail to capture accurately the mouth shapes and detailed facial texture on an unknown test subject whose facial characteristics differ from the training data. The state-of-the-art methods of Chen et al. (e.g., 'Chen, L., Maddox, R. K., Duan, Z., Xu, C.: Hierarchical cross-modal talking face generation with dynamic pixel-wise loss. In: Proceedings of the IEEE Conference on Computer Vision and Pattern Recognition. pp. 7832-7841 (2019)') and Vougioukas et al. (e.g., Vougioukas, K., Petridis, S., Pantic, M.: Realistic speech-driven facial animation with gans. arXiv preprint arXiv:1906.06337 (2019)) were evaluated using their publicly available pre-trained models trained on LRW and TCD-TIMIT datasets respectively. In these methods, the generated face can appear to be very different from the target identity (e.g., Vougioukas et al.) and there can be significant blur in the mouth region Chen et al., leading to unrealistic face animation.

In recent years many researchers have focused on synthesis of 2D talking face video from audio input (e.g., refer (a) 'Chung, J. S., Jamaludin, A., Zisserman, A.: You said that? arXiv preprint arXiv:1705.02966 (2017)—also referred as Chung et al., (b) 'Chen, L., Li, Z., K Maddox, R., Duan, Z., Xu, C.: Lip movements generation at a glance. In: Proceedings of the European Conference on Computer Vision (ECCV). pp. 520-535 (2018), (c) Chen, L., Maddox, R. K., Duan, Z., Xu, C.: Hierarchical cross-modal talking face generation with dynamic pixel-wise loss. In: Proceedings of the IEEE Conference on Computer Vision and Pattern Recognition. pp. 7832-7841 (2019)—also referred as Chen et al., (d) Vougioukas et al., (e) Suwajanakorn, S., Seitz, S. M., Kemelmacher-Shlizerman, I.: Synthesizing obama: learning lip sync from audio. ACM Transactions on Graphics (TOG) 36(4), 95 (2017)—also referred as Suwajanakorn et al., (f) Zhou, H., Liu, Y., Liu, Z., Luo, P., Wang, X.: Talking face generation by adversarially disentangled audio-visual representation. In: Proceedings of the AAAI Conference on Artificial Intelligence. vol. 33, pp. 9299{9306 (2019)—also referred as Zhou et and (g) Song, Y., Zhu, J., Wang, X., Qi, H.: Talking face generation by conditional recurrent adversarial network. arXiv preprint arXiv:1804.04786 (2018)—also referred as Song et al. These methods animate an entire face from speech. However, these methods and other additional approaches (e.g., Fan, B., Wang, L., Soong, F. K., Xie, L.: Photo-real talking head with deep bidirectional lstm. In: 2015 IEEE International Conference on Acoustics, Speech and Signal Processing (ICASSP). pp. 4884{4888. IEEE (2015)—also referred as Fan et al., and Garrido, P., Valgaerts, L., Sarmadi, H., Steiner, I., Varanasi, K., Perez, P., Theobalt, C.: Vdub: Modifying face video of actors for plausible visual alignment to a dubbed audio track. In: Computer graphics forum. vol. 34, pp. 193{204. Wiley Online Library (2015)—also referred as Garrido et al. learn subject-specific 2D facial animation require a large amount of training data of the target subject.

The first subject-independent learning method (e.g., refer 'Chung et al.') achieves lip synchronization but images generated in Chung et al., require additional de-blurring. Hence GAN-based methods were proposed by above existing approaches for generating sharp facial texture in speech-driven 2D facial animation. Although these methods animate the entire face, they mainly target lip synchronization with audio, by learning disentangled audio representations (e.g., refer 'Mittal, G., Wang, B.: Animating face using disentangled audio representations. In: The IEEE Winter Conference on Applications of Computer Vision. pp. 3290{3298 (2020)—also referred as Mittal et al.,') for robustness to noise and emotional content in audio and disentangled audio-visual representations (e.g., refer Zhou et al.) to segregate identity information from speech (e.g., refer Zhou et al. and Chen et al.). However, these methods have not addressed the other aspects needed to achieve the overall realism of synthesized face video, such as natural expressions, identity preservation of target.

Beyond lip synchronization—Realistic facial animation: The absence of spontaneous movements such as eye blinks in synthesized face videos is easily perceived as being fake (e.g., refer 'Li, Y., Chang, M. C., Lyu, S.: In ictu oculi: Exposing ai generated fake face videos by detecting eye blinking. arXiv preprint arXiv:1806.02877 (2018)'—also referred as Li et al.). Recent works such as Vougioukas et al., have tried to address the problem of video realism by using adversarial learning of spontaneous facial gestures such as blinks. However, the generated videos with natural expressions may still imperfectly resemble the target identity, which can also be perceived as being fake. To retain facial identity information from the given identity image of target, image attention has been learnt with the help of facial landmarks in a hierarchical approach (e.g., refer Chen et al.). In this approach as described in Chen et al., the audio is used to generate motion on 2D facial landmarks, and the image texture is generated by conditioning on the landmarks. Although the generated texture in static facial regions can retain the texture from the identity image, the generated texture in regions of motion, especially the eyes and mouth, can differ from the target identity. Hence identity-specific texture generation is needed for realistic rendering of a target's talking face.

Therefore, embodiments of the present disclosure provide systems and methods for generating audio-speech driven animated talking face using a cascaded generative adversarial network. Given an arbitrary speech, and a set of images of a target face, the objective of the method and system of the present disclosure is to synthesize speech synchronized realistic animation of the target face. Inspired by Chen et al., the systems and methods of the present disclosure capture facial motion in a lower dimension space represented by 68 facial landmark points and synthesize texture conditioned on motion of predicted landmarks. To this end, the system and method implement a GAN based cascaded learning approach consisting of the following: (1) Learning speech-driven motion on 2D facial landmarks independent of identity, (2) Learning eye blink motion on landmarks, (3) Landmark retargeting to generate target specific facial shape along with motion, (4) Generating facial texture from motion of landmarks.

Referring now to the drawings, and more particularly to FIGS. 2 through 13, where similar reference characters denote corresponding features consistently throughout the figures, there are shown preferred embodiments and these embodiments are described in the context of the following exemplary system and/or method.

Figure 2:
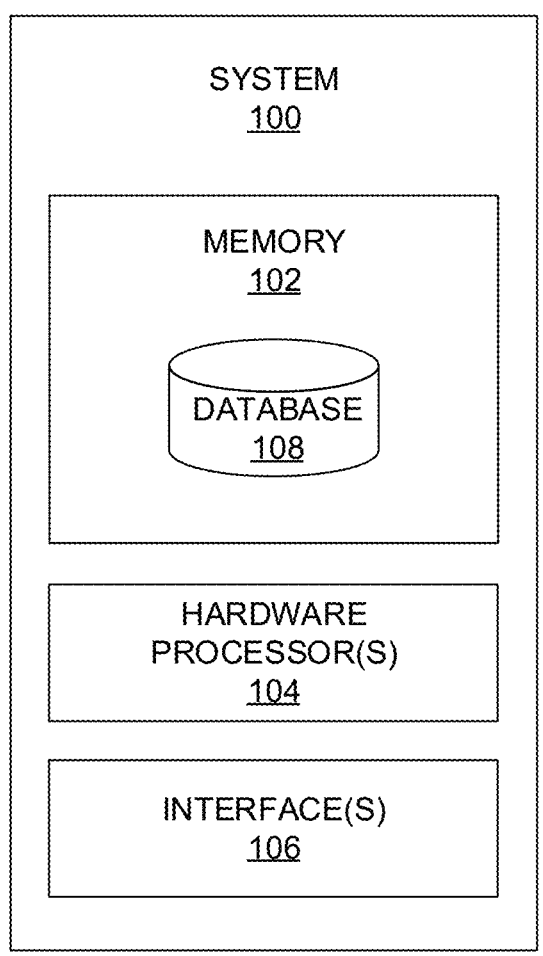
FIG. 2 depicts a system for generating audio-speech driven animated talking face of a target individual using a cascaded generative adversarial network, in accordance with an embodiment of the present disclosure.

FIG. 2 depicts a system 100 for generating audio-speech driven animated talking face of a target individual using a cascaded generative adversarial network, in accordance with an embodiment of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or nonvolatile memory, such as read only memory (ROM), erasable programmable ROM, flash memories, hard disks, optical disks, and magnetic tapes. In an embodiment, a database 108 is comprised in the memory 102, wherein the database 108 comprises image datasets, video datasets, audio speech of one or more users (e.g., target individuals), neutral mean face and the like.

The information stored in the database 108 may further comprise (i) DeepSpeech features of the target individual being extracted from the audio speech of the target individual (also referred as a user and interchangeably used herein), wherein the DeepSpeech features are extracted using a DeepSpeech features technique (or DeepSpeech features extraction technique and may be interchangeably used herein) comprised in the memory 102. The information stored in the database 108 (or memory 102) may further comprise a cascaded generative adversarial network comprising a first GAN (I-GAN) and a second GAN (t-GAN). The first GAN of the cascaded GAN, wherein the first GAN is trained for generating speech-induced motion on a sparse representation of a neutral mean face, wherein the sparse representation of the speech-induced motion comprises a plurality of facial landmark points. The database 108 further comprises a plurality of eye blink movements generated from random noise input using one or more video datasets. Further, the database 108 comprises one or more target-specific landmark points generated for each user. The database 108 further comprises meta-learning-based texture (e.g., talking face) generated for each target individual using the cascaded GAN (or the second GAN of the cascaded GAN).

In an embodiment, one or more techniques, neural networks, and the like, as known in the art are comprised in the memory 102 and invoked as per the requirement to perform the methodologies described herein. For instance, the system 100 stores a DeepSpeech features technique, the first GAN, OpenFace, face segmentation technique, a blink generation network, the second GAN in the memory 102 that are invoked for execution of the method of the present disclosure. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 3:
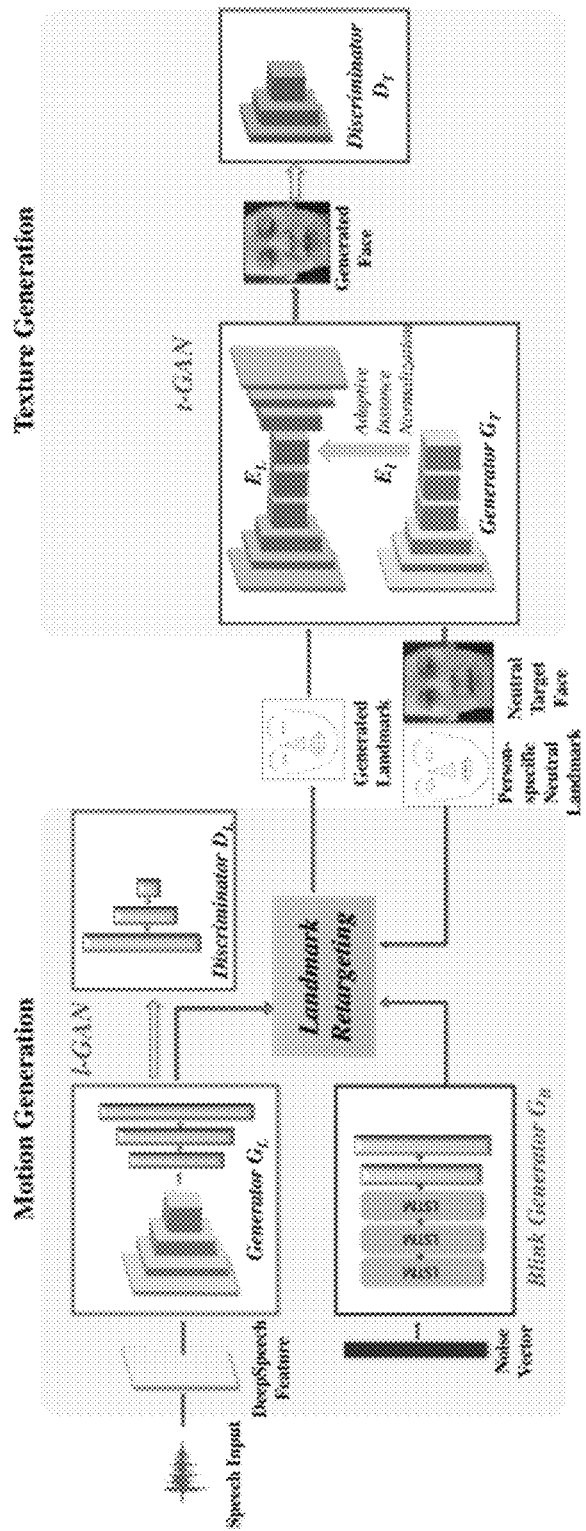
FIG. 3 depicts a block diagram of an architecture as implemented by the system of FIG. 2 for generating audio-speech driven animated talking face of a target individual using the cascaded generative adversarial network, in accordance with an embodiment of the present disclosure.

FIG. 3, with reference to FIG. 2, depicts a block diagram of an architecture as implemented by the system 100 of FIG. 2 for generating audio-speech driven animated talking face of a target individual using a cascaded generative adversarial network, in accordance with an embodiment of the present disclosure.

Figure 4:
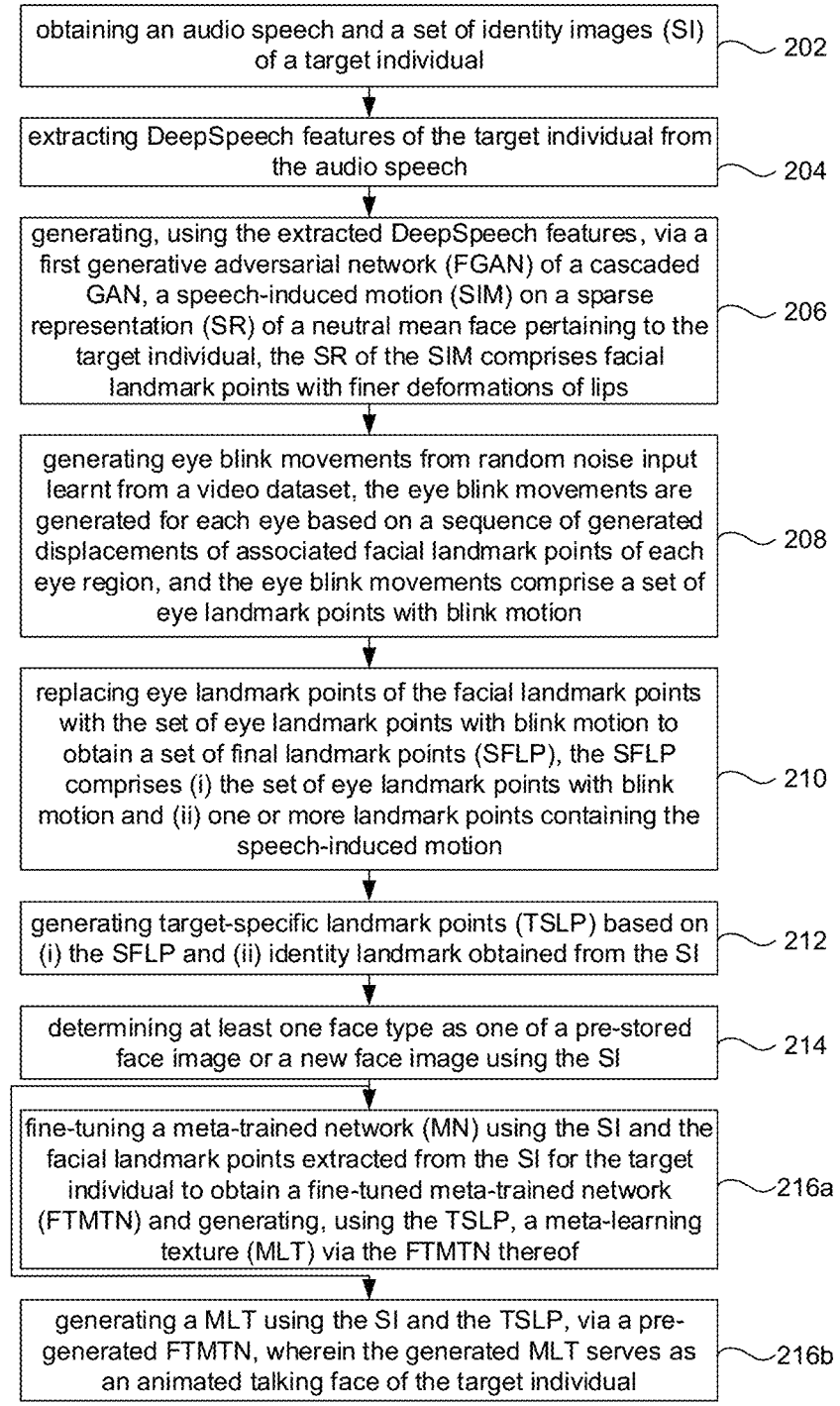
FIG. 4 depicts an exemplary flow chart illustrating a method for generating audio-speech driven animated talking face of a target individual using a cascaded generative adversarial network comprised in the system of FIG. 2, in accordance with an embodiment of the present disclosure.

FIG. 4, with reference to FIGS. 2-3, depicts an exemplary flow chart illustrating a method for generating audio-speech driven animated talking face of a target individual using a cascaded generative adversarial network comprised in the system 100 of FIG. 2, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 2, the block diagram of FIG. 3, the flow diagram as depicted in FIG. 4 and diagrams of FIGS. 5 through 13. In an embodiment, at step 202 of the present disclosure, the one or more hardware processors 104 obtain an audio speech and a set of identity images (SI) of a target individual as depicted in FIG. 3. Though FIG. 3 does not depict the set of identity images (SI), it is to be understood by a person having ordinary skill in the art or person skilled in the art that the system 100 receives audio speech and the set of identity images as input, and shall input shall not be construed as limiting the scope of the present disclosure. The set of identity images comprises two or more images, each image containing a neutral facial expression, in one example embodiment of the present disclosure. Each of the identity image is a Red Green Blue (RGB) image, in another embodiment of the present disclosure. At step 204 of the present disclosure, the one or more hardware processors 104 extract, using the DeepSpeech features extraction technique executed by the one or more hardware processors, one or more DeepSpeech features of the target individual from the audio speech. The extraction of DeepSpeech features from the audio speech is better understood by way of the following description:

The system and method extract audio features (e.g., DeepSpeech features) from the final layer of the DeepSpeech network (e.g., refer 'Hannun, A., Case, C., Casper, J., Catanzaro, B., Diamos, G., Elsen, E., Prenger, R., Satheesh, S., Sengupta, S., Coates, A., et al.: Deep speech: Scaling up end-to-end speech recognition. arXiv preprint arXiv:1412.5567 (2014)'—also referred as Hannun et al.) before the softmax functions. The system and method of the present disclosure consider sliding windows of $\Delta t$ features for providing a temporal context to each video frame. To compute accurate facial landmark required for the training of the system 100, different existing state-of-the-art methods (e.g., refer (a) 'Baltrusaitis, T., Zadeh, A., Lim, Y. C., Morency, L. P.: Openface 2.0: Facial behavior analysis toolkit. In: 2018 13th IEEE International Conference on Automatic Face & Gesture Recognition (FG 2018). pp. 59{66. IEEE (2018)', (b) Yu, C., Wang, J., Peng, C., Gao, C., Yu, G., Sang, N.: Bisenet: Bilateral segmentation network for real-time semantic segmentation. In: Proceedings of the European Conference on Computer Vision (ECCV). pp. 325{341 (2018)—also referred as Yu et al., and (c) Kazemi, V., Sullivan, J.: One millisecond face alignment with an ensemble of regression trees. In: Proceedings of the IEEE conference on computer vision and pattern recognition. pp. 1867{1874 (2014)—also referred as Kazemi et al.,) were experimented and found that the combination of OpenFace (e.g., Baltrusaitis et al.,) and face segmentation (e.g., Yu et al.) to be more effective for the implementation by the present disclosure. Speech-driven motion generation network as implemented by the system of the present disclosure was trained on the TCD-TIMIT dataset. The canonical landmarks used for training I-GAN were generated by an inverse process of the landmark retargeting method as described in later section. The I-GAN network was trained with a batch size of 6. Losses saturate after 40 epochs, which took around 3 hours on a single GPU of Quadro P5000 system. Adam optimization (e.g., refer 'Kingma, D. P., Ba, J.: Adam: A method for stochastic optimization. arXiv preprint arXiv:1412.6980 (2014)') with a learning rate of 2e-4 was used for training both of I-GAN and blink generator network.

At step 206 of the present disclosure, the one or more hardware processors 104 generate, using the extracted Deep-Speech features, via a first generative adversarial network (FGAN) of the cascaded GAN, a speech-induced motion (SIM) on a sparse representation (SR) of a neutral mean face, wherein the SR of the SIM comprises a plurality of facial landmark points with one or more finer deformations of lips. The cascaded GAN with a discriminator is depicted in FIG. 3, in one embodiment of the present disclosure. In the present disclosure, the speech induced motion is learnt based on (i) a direction of movement of the plurality facial landmark points—also referred as direction loss (e.g., refer equation (3)), (ii) an adversarial loss used for training the FGAN (e.g., refer equation (4)), (iii) a temporal smoothness loss (also referred as Regularization loss) in the plurality facial landmark points of consecutive frames (e.g., refer equation (2)), and (iv) a distance loss between one or more predicted facial landmark points and one or more ground-truth facial landmark points (e.g., refer equation (1)). Neutral mean face is referred as average facial landmark points over a face image dataset(s), in one embodiment of the present disclosure. The one or more finer deformations of lips are predicted by the first generative adversarial network (FGAN), the one or more finer deformations of lips are indicative of a difference between pronunciation of two or more letters in one or more words comprised in the audio speech. The above steps 202 till 206 are better understood by way of following description and examples, which shall not be construed as limiting the scope of the present disclosure.

Let A be an audio signal represented by a series of overlapping audio windows $\{W_t | t \in [0,T]\}$ with corresponding feature representations $\{F_t\}$. The goal of the system and method of the present disclosure is to generate a sequence of facial landmarks $l_t \in \mathbb{R}^{68 \times 2}$ corresponding to the motion driven by speech. A mapping $\mathcal{M}_L : F_t \to \delta l_t$ is learnt to generate speech-induced displacement $\delta l_t \in \mathbb{R}^{68 \times 2}$ on a canonical landmark (person-independent) in neutral pose from the speech features $\{F_t\}$. Learning the speech-related motion on a canonical landmark $l_p^m$ which represents the average shape of a face is effective due to the invariance of any specific facial structure. To generalize well over different voices, accent etc. a pre-trained DeepSpeech model (e.g., refer 'Hannun et al.') to extract the feature $F_t \in \mathbb{R}^{8 \times 29}$.

Adversarial Learning of Landmark Motion: Systems and methods use an adversarial network I-GAN to learn the speech-induced landmark displacement $\mathcal{M}_L$. The generator network $G_L$ generates displacements $\{\delta l_p^m\}$ of a canonical landmark from a neutral pose $l_p^m$. The discriminator $D_L$ as depicted in FIG. 3 takes the resultant canonical landmarks $\{l_t^m = l_p^m + \delta l_t^m\}$ and the ground-truth canonical landmarks as inputs to learn real against fake.

Loss functions: The loss functions training I-GAN are as follows:

Distance loss: This is mean-squared error (MSE) loss between generated canonical landmarks $\{l_t^m\}$ and ground-truth landmarks $\{l_t^{m*}\}$ for each frame.

$$L_{dist} = \|l_t^m - l_t^{m*}\|_2^2 \quad (1)$$

Regularization loss: $L_2$ loss is used between consecutive frames for temporal smoothness.

$$L_{reg} = \|l_t^m - l_{t-1}^m\|_2^2 \quad (2)$$

Direction loss: A consistency of the motion vectors is also imposed:

$$L_{dir} = \|\overrightarrow{\delta l_t^m} - \overrightarrow{\delta l_t^{m*}}\|_2^2 \quad (3)$$

where $$\overrightarrow{\delta l_t^m} = \begin{cases} 1, & \text{if } l_{t+1}^m > l_t^m \\ 0, & \text{otherwise} \end{cases}$$

GAN loss: An adversarial loss is used for generation of distinct mouth shapes.

$$L_{gan} = \mathbb{E}_{l_t^{m*}}[\log(D_L(l_t^{m*}))] + \mathbb{E}_{F_t}[\log(1 - D_L(G_L(l_p^m, F_t)))] \quad (4)$$

The final objective function which is to be minimized is as follows:

$$L_{motion} = \lambda_{dist} L_{dist} + \lambda_{reg} L_{reg} + \lambda_{dir} L_{dir} + \lambda_{gan} L_{gan} \quad (5)$$

$\lambda_{dist}$, $\lambda_{reg}$, $\lambda_{dir}$, and $\lambda_{gan}$ are loss parameters defining contribution of each loss term, and are experimentally set to 1, 0.5, 0.5 and 1 as presented in the ablation study in the later sections.

Referring to steps of FIG. 4, at step 208 of the present disclosure, the one or more hardware processors 104 generate a plurality of eye blink movements from random noise input using a video dataset, wherein the plurality of eye blink movements are generated for each eye based on a sequence of generated displacements of associated facial landmark points of each eye region, and wherein the plurality of eye blink movements comprise a set of eye landmark points with blink motion. In an embodiment, the step of generating, via a video dataset, a plurality of eye blink movements from random noise input, comprises: performing a comparison of the sequence of generated displacements of the associated facial landmark points of each eye region with one or more ground truth displacements, wherein one or more higher order moments of distribution of the sequence of generated displacements are compared with the one or more ground truth displacements; and generating the plurality of eye blink movements based on the comparison. In an embodiment, the one or more higher order moments of the sequence of generated displacements comprise one or more statistics of the distribution of the sequence of generated displacements. In an embodiment, the one or more statistics of the distribution of the sequence of generated displacements comprise at least one of a mean, a variance, and a skewness, wherein a Maximum Mean Discrepancy (MMD) loss is computed using the one or more statistics, and wherein the MMD loss is a measure of similarity or a dissimilarity between a distribution of (i) the plurality of eye blink movements and (ii) one or more ground truth eye blink movements.

At step 210 of the present disclosure, the one or more hardware processors 104 replace one or more eye landmark points of the plurality of facial landmark points with the set of eye landmark points with blink motion to obtain a set of final landmark points, the set of final landmark points comprises (i) the set of eye landmark points with blink motion and (ii) one or more landmark points containing the speech-induced motion. The above steps 208 till 210 are better understood by way of following description and examples, which shall not be construed as limiting the scope of the present disclosure.

Eye blinks are essential for realism of synthesized face animation, but not dependent on speech. Therefore, the system of the present disclosure implements an unsupervised method for generation of realistic eye blinks through learning a mapping $\mathcal{M}_B : Z_t \rightarrow \delta l_t^e$ from a random noise $Z_t \cdot \mathcal{N}(\mu, \sigma^2) | t \in (0,T)$ to eye landmark displacements $\{\delta l_t^e \in \mathbb{R}^{22 \times 2}\}$.

Blink generator network $G_B$ of the system 100 learns the blink pattern and duration through the mapping $\mathcal{M}_B$ and generates a sequence $\{l_t^e\}$ on canonical landmarks by minimizing the MMD loss as follows:

$$L_{MMD} = \mathbb{E}_{X,X' \sim p} \mathcal{K}(X,X') + \mathbb{E}_{Y,Y' \sim q} \mathcal{K}(Y,Y') - 2\mathbb{E}_{X \sim p, Y \sim q} \mathcal{K}(X,Y) \quad (6)$$

where $\mathcal{K}(X,Y)$ is defined as exp $$\left( -\frac{|x-y|^2}{2\sigma} \right),$$

p and q represent distributions of the GT $\delta l_t^{e*}$ and generated eye landmark motion $\{\delta l_t^e\}$ respectively. The system also uses a min-max regularization to ensure that the range of the generated landmarks matches with the average range of average displacements present in the training data.

The system 100 then augments the eye blink with the speech-driven canonical landmark motion (output of step 206) and retarget the combined motion $l_t^M = \{l_t^m \cup l_t^e\}$ to person-specific landmark, wherein $\{l_t^e = l_p^e + \delta l_t^e\}$ to generate the person-specific landmarks $\{l_t\}$ for subsequent use for texture generation. The above steps 208 and 210 can be also better understood from Applicant's previous patent application number '202021021475' filed on May 21, 2020. Such referencing to steps 208 and 210 to the Applicant's previous patent application number shall not be construed as limiting the scope of the present disclosure.

In an embodiment, at step 212 of the present disclosure, the one or more hardware processors 104 generate one or more target-specific landmark points (TSLP) based on (i) the set of final landmark points (FLP) and (ii) an identity landmark obtained from the set of identity images. The step 212 may be alternatively referred as landmark retargeting. The above 212 may be better understood by way of following description:

The system 100 then retargets the canonical landmarks $\{l_t^M\}$ generated by $G_L$ to person-specific landmarks $\{l_t\}$ (used for texture generation) as follows:

$$\delta l_t' = \mathcal{T}(l_t^M) - \mathcal{T}(l_p^m) \quad (7)$$

$$\delta l_t = \delta l_t' * S(l_t) / S(\mathcal{T}(l_t^M)) \quad (8)$$

$$l_t = l_p + \delta l_t \quad (9)$$

where $\{l_t^m = l_p^m + \delta l_t^m\}$, $l_p$ is the person-specific landmark in neutral pose (extracted from the target image), $S(l) \in \mathbb{R}^2$ is the scale (height×width) of l and $\mathcal{T} : l \rightarrow l'$ represents a Procrustes (rigid) alignment of landmark l and $l_p$.

At step 214 of the present disclosure, the one or more hardware processors 108 determine at least one face type as one of a pre-stored face image or a new face image using the set of identity images. Alternatively, the at least one face type may be obtained as an input (e.g., input from a user). User may provide this input face type based on the set of identity images comprised in the system 100. Based on the at least one determined face type, the one or more hardware processors 108 perform, via a second generative adversarial network (SGAN) of the cascaded GAN executed by the one or more hardware processors, at step 216a, fine-tune a meta-trained network (MN) using the set of identity images (SI) and the plurality of facial landmark points extracted from the SI for the target individual to obtain a fine-tuned meta-trained network (FTMTN) and then generate a meta-learning texture (MLT) (also referred as meta-learning-based texture and interchangeably used herein) via the FTMTN using the one or more target-specific landmark points (TSLP); or at step 216b generate the meta-learning texture (MLT) using the SI and the one or more target-specific landmark points (TSLP), via a pre-generated fine-tuned meta-trained network (FTMTN). In an embodiment, the generated MLT serves as an animated talking face of the target individual. In other words, if the at least one determined face type is a new face image then the system and method of the present disclosure perform step 216a, in one example embodiment. If the at least one determined face type is a pre-stored face image comprised in the system 100, then the system and method of the present disclosure perform step 216b, in another example embodiment. The steps 214 till 216a and 216b are better understood by way of following description and examples, which shall not be construed as limiting the scope of the present disclosure.

Systems and methods of the present disclosure use the person-specific landmarks $\{l_t\}$ containing motion due to the speech and the eye blink to synthesize animated face images $\{I_t\}$ by learning a mapping $\mathcal{M}_T : (l_t, \{I^n\}) \rightarrow I_t$ using given target images $\{I^n | n \in [0,N]\}$.

Adversarial Generation of Image Texture:

Systems and methods of the present disclosure use an adversarial network t-GAN (e.g., also referred as the second GAN, deep tensor generative adversarial network and interchangeably used herein) to learn the mapping $\mathcal{M}_T$. Generator network $G_T$ as depicted in FIG. 3 consists of a texture encoder $E_I$ and landmark encoder-decoder $E_L$ influenced by $E_I$. $E_I$ encodes the texture representation as $e = E_I(I^n)$ for the input N images. The system 100 of the present disclosure uses Adaptive Instance Normalization (e.g., refer 'Huang, X., Belongie, S.: Arbitrary style transfer in real-time with adaptive instance normalization. In: Proceedings of the IEEE International Conference on Computer Vision. pp. 1501{1510 (2017)'—also referred as Huang et al.) to modulate the bottleneck of $E_L$ using e. Finally, a discriminator network $D_T$ is implemented by the system as depicted in FIG. 3 to discriminate the real images from fake.

Loss Functions:

The losses for training the t-GAN are as follows:
Reconstruction loss: The $L_2$ distance between the images $\{I_t\}$ and the GT images $\{I_t^*\}$ $$L_{pix} = \|I_t - I_t^*\|_2^2 \quad (10)$$

Adversarial loss: For sharpness of the texture an adversarial loss is minimized.

$$L_{adv} = \mathcal{M}_{I_t^*}[\log(D_T(I^n, I_t^*))] + \mathcal{M}_{I_t}[\log(1 - D_T(I^n, G_T(l_t, I^n)))] \quad (11)$$

Perceptual loss: We minimize a perceptual loss (e.g., refer 'Johnson, J., Alahi, A., Fei-Fei, L.: Perceptual losses for real-time style transfer and super-resolution. In: European conference on computer vision. pp. 694{711. Springer (2016)'—also referred as Johnson et al.) which is the different in feature representations of generated images and ground truth images.

$$L_{feat} = \alpha_1 \|vgg1(I_t) - vgg1(I_t^*)\|_2^2 + \alpha_2 \|vgg2(I_t) - vgg2(I_t^*)\|_2^2 \quad (12)$$

where vgg1 and vgg2 are features obtained using pre-trained VGG19 and VGGFace (e.g., refer Parkhi, O. M., Vedaldi, A., Zisserman, A., et al.: Deep face recognition. In: bmvc. vol. 1, p. 6 (2015)—also referred as Parkhi et al.) respectively.

The total loss minimized for training the Texture Generation network is defined as $$L_{texture} = \lambda_{pix} L_{pix} + \lambda_{adv} L_{adv} + \lambda_{feat} L_{feat} \quad (13)$$

$\lambda_{pix}$, $\lambda_{adv}$, and $\lambda_{feat}$ are the loss parameters defining contribution of each loss term in $L_{texture}$.

Meta-Learning:

For meta-learning the system 100 uses a model-agnostic meta-learning (MAML) (e.g., refer Finn et al.,) to train the second GAN (e.g., t-GAN) for quick adaptation to the unknown face at inference time using few images. MAML trains on a set of tasks T called episodes. For each of the tasks, the number of samples for training and validation is $d_{tm}$ and $d_{qry}$ respectively. For the problem, subject specific task is defined as $$T^s = (I_i^s, l_j^s) \ldots \left(I_{j_{d_{tm}+d_{qry}}}^s, l_{j_{d_{tm}+d_{qry}}}^s\right)$$

and task set as $\{T^s\}$ by the system 100 where s is the subject index, $l_i^s$ is the ith face image for subject s, $l_j^s$ is the jth landmark for the same subject s. During meta-learning, MAML store the current weights of the t-GAN into global weights and train the t-GAN with $d_{tm}$ samples for m iteration using a constant step size. During each iteration, it measures the loss $L^i$ with the validation samples $d_{qry}$. Then the total loss $L = L^1 + L^2 \ldots + Lm$ is used to update global weights (operation 4 to 6 in FIG. 5).

Figure 5:
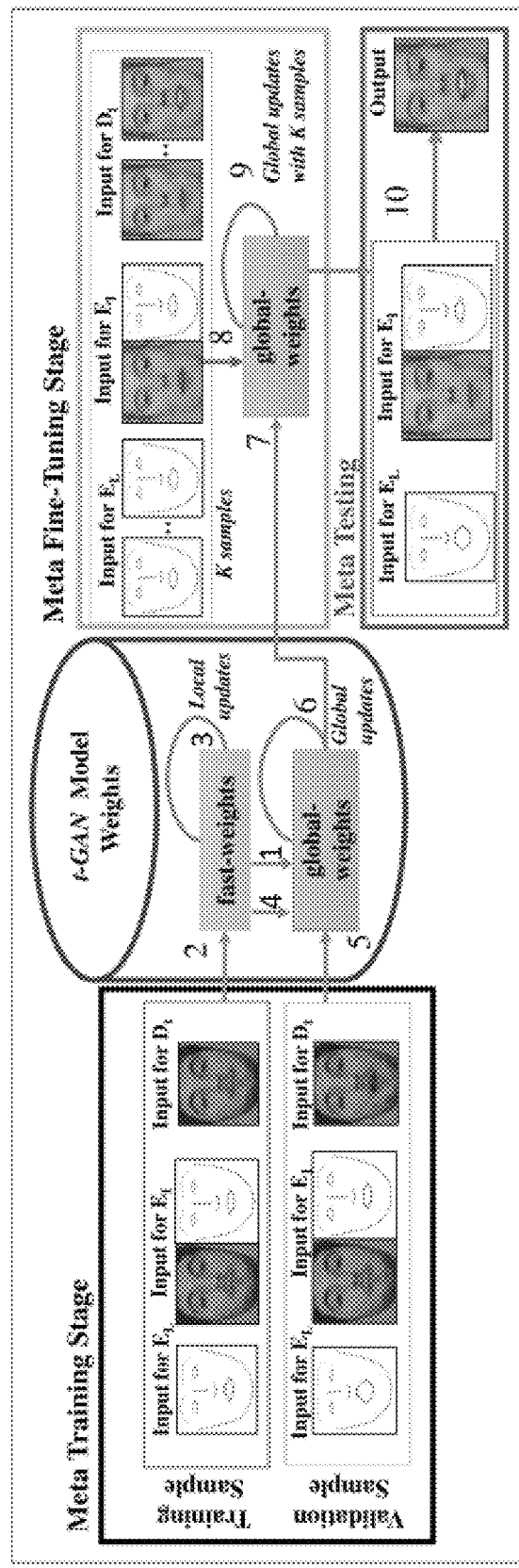
FIG. 5 depicts state transitions of weights of t-GAN during meta-training, in accordance with an example embodiment of the present disclosure.

The resultant direction of the global weights encodes a global information of the t-GAN network for all the tasks which is used as an initialization for fine-tuning during inference. FIG. 5, with reference to FIGS. 2 through 4, depicts state transitions of weights of t-GAN during meta-training, in accordance with an example embodiment of the present disclosure. Fast-weights (FW) and global-weights (GW) are two states of t-GAN's weights. The sequence of training schedule include: (1) copying FW to GW to keep global state unchanged during the training, (2)-(3) update the FW in iterations, (4)-(5) compute validation loss using FW, (6) update GW using total validation loss (7) copy GW for the fine-tuning, (8)-(9) updating the GW using K sample images, (10) using the updated GW to produce target subject's face.

Fine-tuning step: During fine-tuning, the t-GAN is initialized from the global-weights and the weights are updated by minimizing the loss as described in Equation (13) (e.g., refer above equation 13). The system and method utilize a few (K) example images of the target face (K=20) for the fine-tuning.

Experimental Results:

Embodiments of the present disclosure present the detail experiment results for the method of the present disclosure on different datasets. Through experimental results, the present disclosure shows the efficacy of motion generation and texture generation of the system and method of the present disclosure in detail along with the network ablation study. Embodiments of the present disclosure also show that the accuracy of the cascaded GAN based approach is quite higher than an alternate regression-based strategy. The meta-learning-based texture generation strategy enables the method of the present disclosure to be more adaptable to the unknown faces. The combined result is a significantly better facial animation from speech than the state-of-the-art methods in terms of both quantitatively and qualitatively. In what follows, detailed results for each of the building blocks of the system and method are described/shown.

Datasets:

The present disclosure and its systems and methods have used state-of-the-art datasets TCD-TIMIT (e.g., refer 'Harte, N., Gillen, E.: TCD-TIMIT: An audio-visual corpus of continuous speech. IEEE Transactions on Multimedia 17(5), 603{615 (2015)—also referred as Harte et al.') and GRID (e.g., refer 'Cooke, M., Barker, J., Cunningham, S., Shao, X.: An audio-visual corpus for speech perception and automatic speech recognition. The Journal of the Acoustical Society of America 120(5), 2421{2424 (2006)—also referred as Cooke et al.') for the experiments. The present disclosure has also recorded a dataset to show the efficacy of present disclosure's model for completely unknown faces. The present disclosure's model was trained only on TCD-TIMIT and the model was tested on GRID and the recorded data showed the ability of the method of the present disclosure for cross dataset testing. The training split contained 3378 videos from 49 subjects with around 6913 sentences uttered in a limited variety of accents. Test split (same as Vougioukas, K., Petridis, S., Pantic, M.: Realistic speech-driven facial animation with gans. arXiv preprint arXiv: 1906.06337 (2019) of TCD-TIMIT and GRID datasets contained 1631 and 9957 videos respectively.

Motion Generation on Landmarks

The motion generation part of the method of the present disclosure consisted of two separate networks for i) speech-induced motion prediction, and ii) realistic generation of eye blinks. Below are the networks described in detail:

Network Architecture of I-GAN: The architecture of the Generator network $G_L$ has been built upon the encoder-decoder architecture used in existing approach (e.g., refer 'Cudeiro, D., Bolkart, T., Laidlaw, C., Ranjan, A., Black, M. J.: Capture, learning, and synthesis of 3d speaking styles. In: Proceedings of the IEEE Conference on Computer Vision and Pattern Recognition. pp. 10101{10111 (2019)'—also referred as Cudeiro et al.) for generating mesh vertices. LeakyReLU (e.g., refer 'Xu, B., Wang, N., Chen, T., Li, M.: Empirical evaluation of rectified activations in convolutional network. arXiv preprint arXiv:1505.00853 (2015)'— also referred as Xu et al.) activation was used after each layer of the encoder net-work. The input DeepSpeech features were encoded to a 33-dimensional vector, which is decoded to obtain the canonical landmark displacements from the neutral pose. The discriminator network $D_L$ consists of 2 linear layers and produces a real value to indicate if the generated landmark is real or fake. Weights of last layer of the decoder in $G_L$ and the first layer of $D_L$ with 33

PCA components computed over the landmark displacements in training data were initialized.

Network Architecture of Blink Generator $G_B$: The system and method of the present disclosure use recurrent neural network (RNN) as known in the art to predict a sequence of displacements $\mathbb{R}^{n \times 75 \times 44}$, i.e., x, y coordinates of eye landmarks $l_t^e \in \mathbb{R}^{22 \times 2}$ over 75 timestamps from given noise vector $z \cdot \mathcal{N}(\mu, \sigma^2)$ with $z \in \mathbb{R}^{n \times 75 \times 10}$. Similar to the $G_L$ of the I-GAN comprised in the cascaded GAN of the system 100, the last linear layer weights were initialized with PCA components (with 99% variants) computed over ground-truth eye landmark displacements.

Training Details: Audio features (e.g., DeepSpeech features) were extracted from the final layer of the DeepSpeech network (e.g., refer 'Hannun, A., Case, C., Casper, J., Catanzaro, B., Diamos, G., Elsen, E., Prenger, R., Satheesh, S., Sengupta, S., Coates, A., et al.: Deep speech: Scaling up end-to-end speech recognition. arXiv preprint arXiv: 1412.5567 (2014)'—also referred as Hannun et al.) before the softmax functions. The system and method of the present disclosure consider sliding windows of $\Delta t$ features for providing a temporal context to each video frame. To compute accurate facial landmark required for the training of the system 100, different existing state-of-the-art methods (e.g., refer (a) 'Baltrusaitis, T., Zadeh, A., Lim, Y. C., Morency, L. P.: Openface 2.0: Facial behavior analysis toolkit. In: 2018 13th IEEE International Conference on Automatic Face & Gesture Recognition (FG 2018). pp. 59{66. IEEE (2018)', (b) Yu, C., Wang, J., Peng, C., Gao, C., Yu, G., Sang, N.: Bisenet: Bilateral segmentation network for real-time semantic segmentation. In: Proceedings of the European Conference on Computer Vision (ECCV). pp. 325{341 (2018)—also referred as Yu et al., and (c) Kazemi, V., Sullivan, J.: One millisecond face alignment with an ensemble of regression trees. In: Proceedings of the IEEE conference on computer vision and pattern recognition. pp. 1867{1874 (2014)—also referred as Kazemi et al.,) were experimented and found that the combination of OpenFace (e.g., Baltrusaitis et al.,) and face segmentation (e.g., Yu et al.) to be more effective for the implementation by the present disclosure. Speech-driven motion generation network as implemented by the system of the present disclosure was trained on the TCD-TIMIT dataset. The canonical landmarks used for training I-GAN were generated by an inverse process of the landmark retargeting method as described in later section. The I-GAN network was trained with a batch size of 6. Losses saturate after 40 epochs, which took around 3 hours on a single GPU of Quadro P5000 system. Adam optimization (e.g., refer 'Kingma, D. P., Ba, J.: Adam: A method for stochastic optimization. arXiv preprint arXiv:1412.6980 (2014)') with a learning rate of 2e-4 was used for training both of I-GAN and blink generator network.

Qualitative results: Present disclosure provides quantitative results in Table 1 and 2. For comparative analysis, publicly available pre-trained models of state-of-the-art methods (e.g., Chen et al., Zhou et al., and Vougioukas et al.). Similar to I-GAN, the t-GAN was trained on TCD-TIMIT (e.g., refer Harte et al.), and evaluated on the test split of GRID (e.g., refer Cooke et al.), TCD-TIMIT and the unknown subjects, while models of Chen et al. and Zhou et al. were pre-trained on LRW dataset (e.g., refer 'Chung, J. S., Zisserman, A.: Lip reading in the wild. In: Asian Conference on Computer Vision. pp. 87{103. Springer (2016)'—also referred as Chung et al.). Model described in Vougioukas et al., was trained on both TCD-TIMIT and GRID.

For evaluating and comparing the accuracy of lip synchronization produced by the method of the present disclosure, system and method of the present disclosure used a) LMD, Landmark Distance (as used in Chen et al.) and b) Audio-Visual synchronization metrices (AV Offset and AV confidence produced by Syncnet [?]). For all methods, LMD was computed using lip landmarks extracted from the final generated frames. Lower value of LMD and AV offset with higher AV confidence indicates better lip synchronization. The method of the present disclosure showed better accuracy compared to state-of-the-art methods. The present disclosure's models trained on TCD-TIMIT also showed good generalization capability in cross-dataset evaluation on GRID dataset (Table 2). Although Chen et al. also generates facial landmarks from audio features (MFCC), unlike their regression-based approach, the use of DeepSpeech features, landmark retargeting, and adversarial learning as implemented in the system and method of the present disclosure results in improved accuracy of landmark generation.

TABLE 1

Comparative results on TCD-TIMIT dataset.

| Methods | Trained on | PSNR | SSIM | CPBD | LMD | ACD $10^{-4}$ | FaceNet | AV Off | AV Conf | Blink(s) | Blink |
|---|---|---|---|---|---|---|---|---|---|---|---|
| Vougioukas et al. (prior art) | TCD-TIMIT | 24.2 | 0.73 | 0.30 | 2.1 | 1.76 | 0.578 | 1 | 5.5 | 0.19 | 0.33 |
| Chen et al. (prior art) | LRW | 20.31 | 0.59 | 0.16 | 1.71 | 1.1 | 0.409 | 1 | 3.91 | NA | NA |
| Zhou et al. (prior art) | LRW | 23.82 | 0.63 | 0.14 | 1.9 | 1.24 | 0.472 | 1 | 1.94 | NA | NA |
| Method of the present disclosure | TCD-TIMIT | 29.9 | 0.83 | 0.29 | 1.22 | 0.98 | 0.377 | 1 | 5.91 | 0.3 | 0.33 |

TABLE 2

Comparative results on GRID (CROSS-Dataset Evaluation).

| Methods | Trained on | PSNR | SSIM | CPBD | LMD | ACD $10^{-4}$ | FaceNet | WER % | AV Off | AV Conf | Blink(s) | Blink |
|---|---|---|---|---|---|---|---|---|---|---|---|---|
| Vougioukas et al. (prior art) | GRID | 27.1 | 0.81 | 0.26 | 1.56 | 1.47 | 0.802 | 23.1 | 1 | 7.4 | 0.45 | 0.36 |
| Chen et al. (prior art) | LRW | 23.98 | 0.76 | 0.06 | 1.29 | 1.57 | 0.563 | 31.1 | 1 | 5.85 | NA | NA |
| Zhou et al. (prior art) | LRW | 22.79 | 0.76 | 0.04 | 1.49 | 1.78 | 0.628 | 36.72 | 2 | 4.29 | NA | NA |
| Method of the present disclosure | TCD-TIMIT | 30.7 | 0.74 | 0.61 | 1.4 | 1.12 | 0.466 | 19.33 | 1 | 7.72 | 0.38 | 0.4 |

Figure 6:
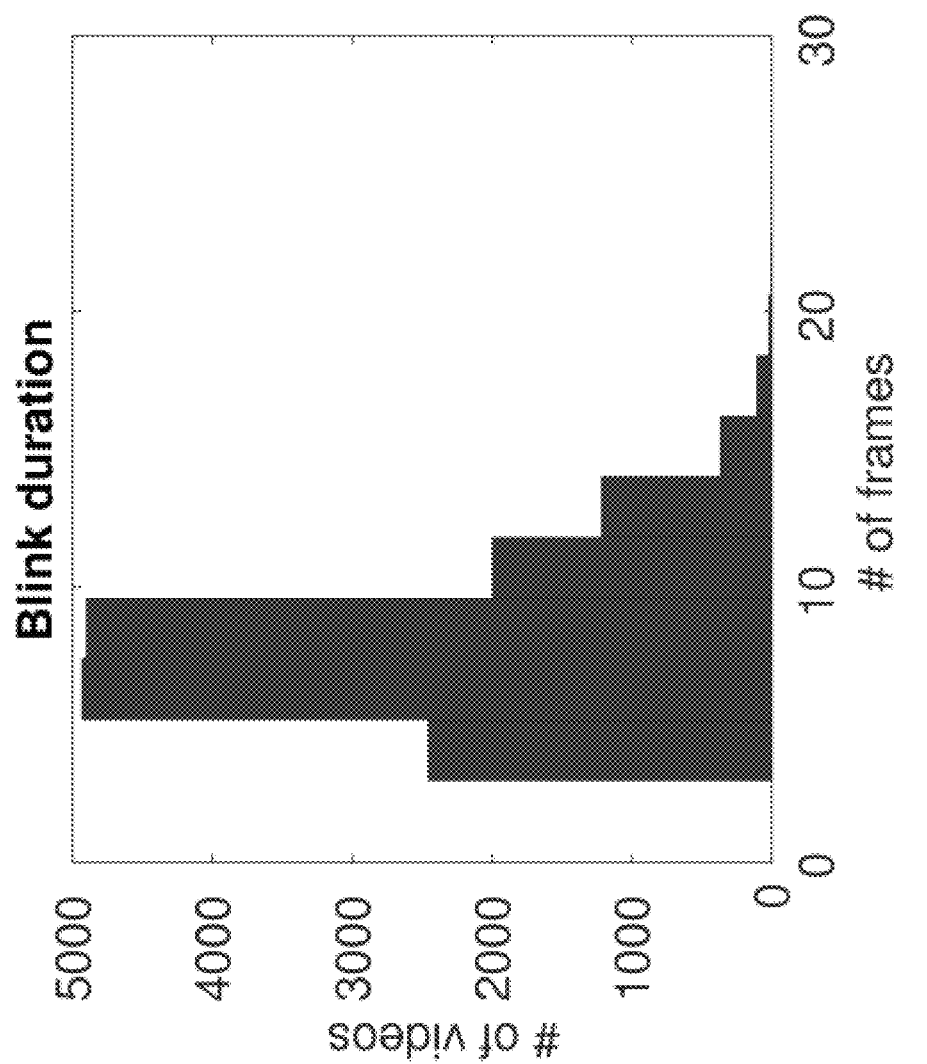
FIG. 6 depicts a graphical representation illustrating distribution of blink durations (in no. of frames) in synthesized videos of GRID and TCD-TIMIT datasets respectively, in accordance with an example embodiment of the present disclosure.

Moreover, the facial landmarks as predicted/generated by the present disclosure contained natural eye blink motion for added realism. Eye blinks were detected by the system 100 using sharp drop in EAR (Eye Aspect Ratio) signal (e.g., refer 'Chen et al.') calculated using landmarks of eye corners and eyelids. Blink duration was calculated as the number of consecutive frames between start and end of the sharp drop in EAR. The average blink duration and blink frequencies generated from the method of the present disclosure is similar to that of natural human blinks. The method of the present disclosure produced a blink rate of 0.3 blink(s) and 0.38 blink(s) (refer above Table 1 and 2) for TCD-TIMIT and GRID datasets respectively which is similar to the average human blink rate of 0.28-0.4 blink(s). Also, the system and method of the present disclosure achieve an average blink duration of 0.33 s and 0.4 s, which is similar to as reported in ground-truth (refer Table 1 and 2). In FIG. 6, a distribution of blink durations (in no. of frames) in synthesized videos of GRID and TCD-TIMIT datasets is depicted. More specifically, FIG. 6, with reference to FIGS. 2 through 5, depicts a graphical representation illustrating distribution of blink durations (in no. of frames) in synthesized videos of GRID and TCD-TIMIT datasets respectively, in accordance with an example embodiment of the present disclosure. So, our method can produce realistic eye blinks similar to [30], but with better identity preserved texture, due to our decoupled learning of eye blinks on landmarks.

Figure 7A:
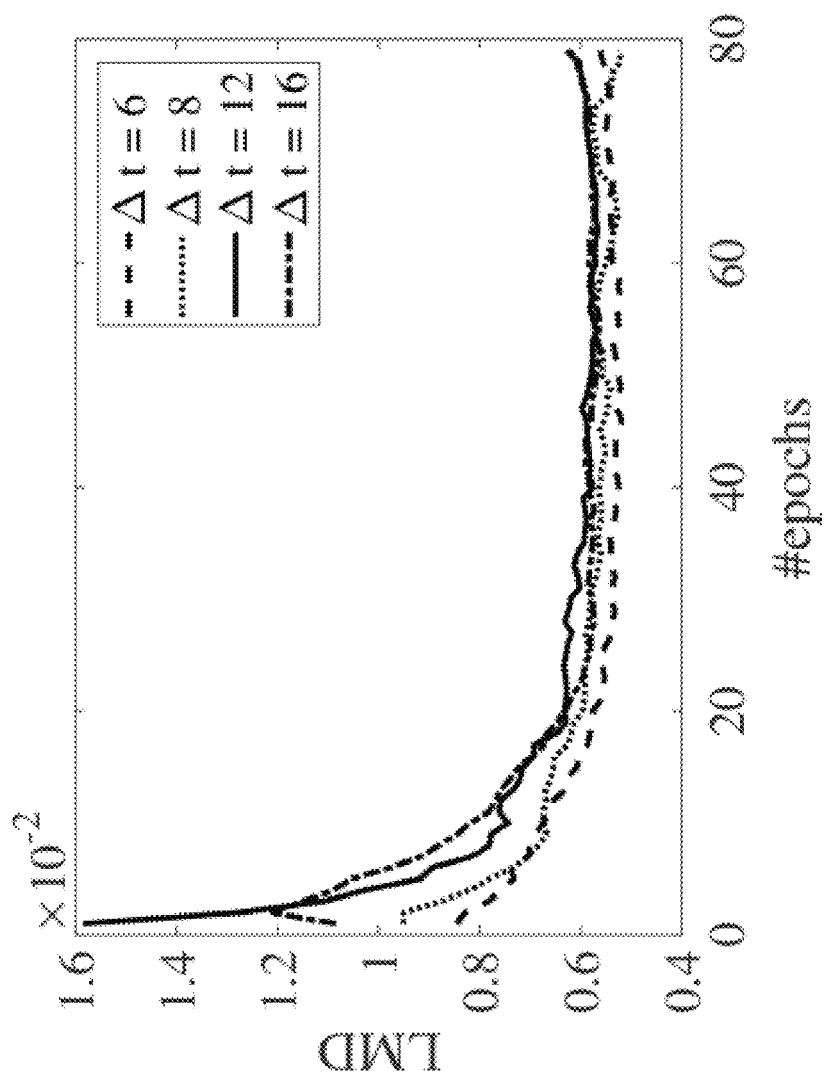
FIG. 7A depicts Landmark Distance (LMD) with varying context window (Δt) of deep-speech features, in accordance with an example embodiment of the present disclosure.
Figure 7B:
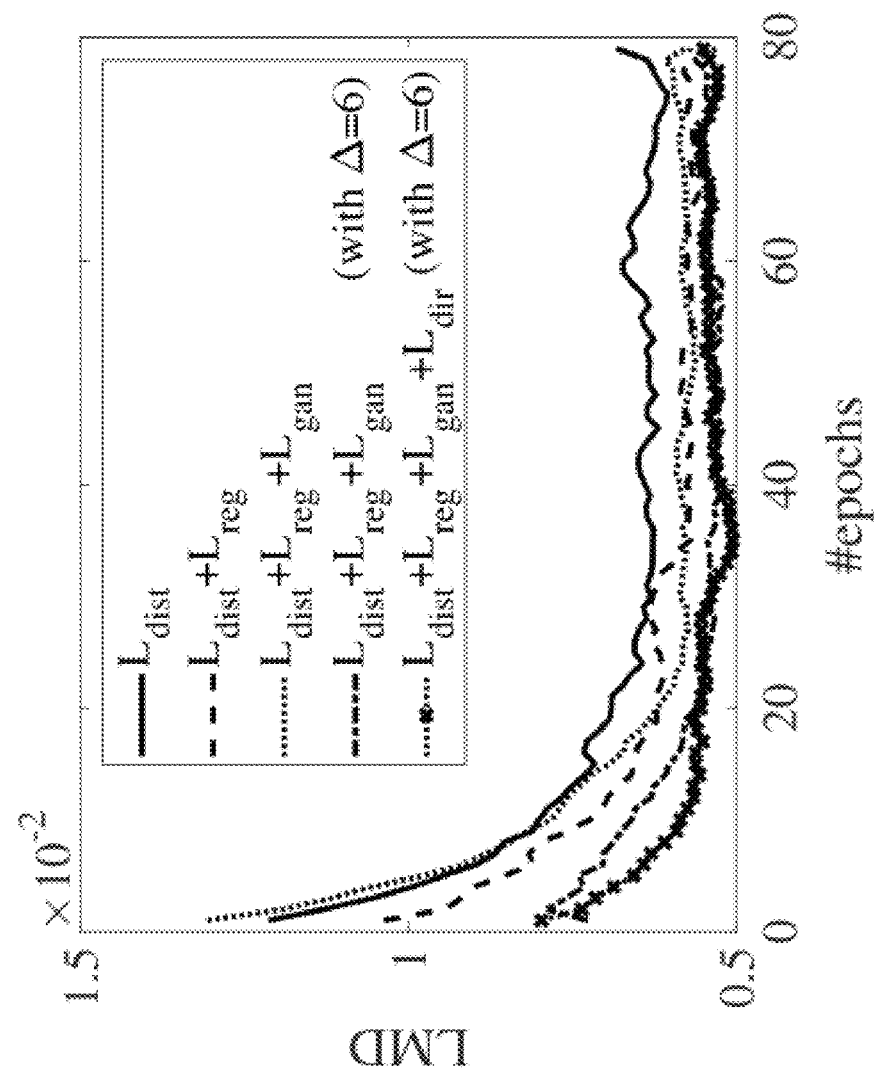
FIG. 7B depicts lip synchronization (LMD) with different losses used for training speech-driven motion generation network, in accordance with an example embodiment of the present disclosure.
Figure 7C:
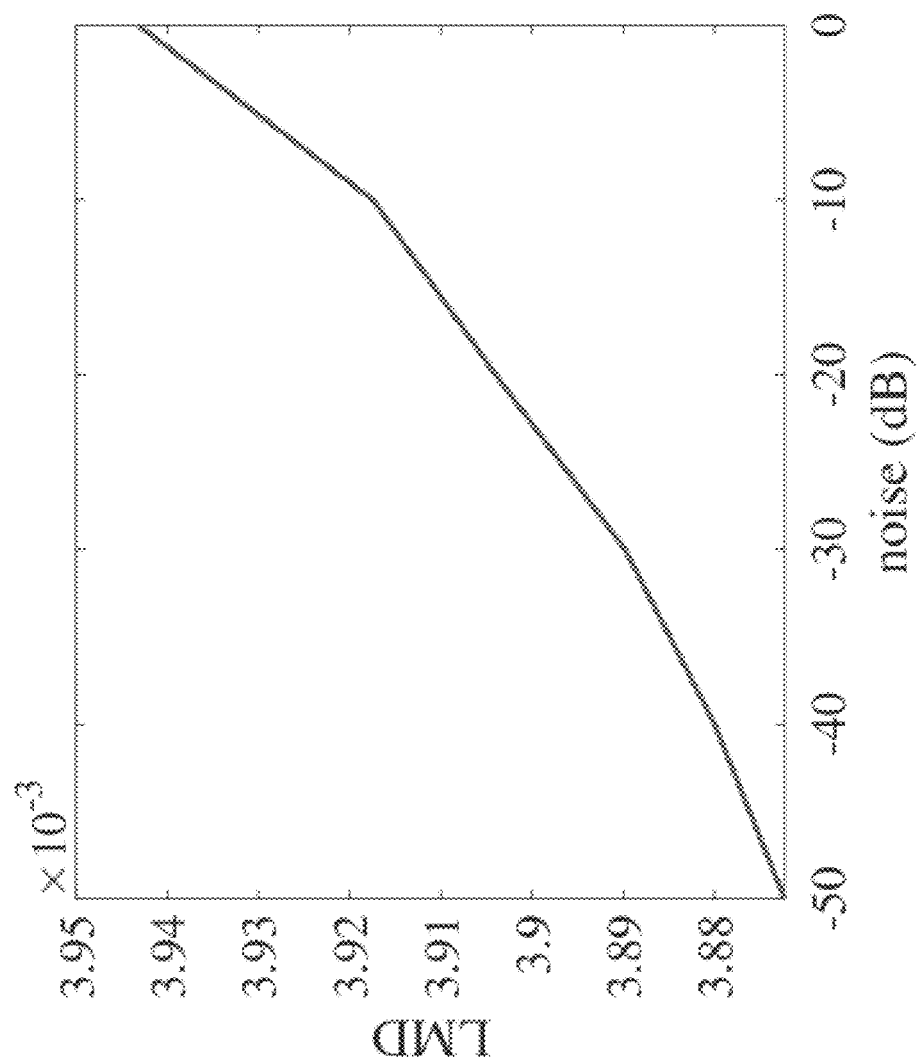
FIG. 7C depicts error in lip synchronization (LMD) with different noise levels, in accordance with an example embodiment of the present disclosure.

Ablation Study: An ablation study of window size $\Delta t$ (FIGS. 7A through 7C) has indicated a value of $\Delta t=6$ frames (duration of around 198 ms) results in the lowest LMD. More specifically, FIG. 7A, with reference to FIGS. 2 through 6, depicts Landmark Distance (LMD) with varying context window ($\Delta t$) of deep-speech features, in accordance with an example embodiment of the present disclosure. FIG. 7B, with reference to FIGS. 2 through 7A, depicts lip synchronization (LMD) with different losses used for training speech-driven motion generation network, in accordance with an example embodiment of the present disclosure. FIG. 7C, with reference to FIGS. 2 through 7B, depicts error in lip synchronization (LMD) with different noise levels, in accordance with an example embodiment of the present disclosure. In FIGS. 7A through 7C, an ablation study for different losses used for training the motion prediction network of the present disclosure is also presented. It is seen that the loss $L_{motion}$ Lmotion of the system and method of the present disclosure achieves best accuracy. Use of $L_2$ regularization loss helps to achieve temporal smoothness and consistency on predicted landmarks over consecutive frames which per frame MSE loss ($L_{dist}$) fails not ensure independently. Direction loss (equation 3) has been used by the present disclosure to capture the relative movements of landmarks over consecutive frames. The motion generation network gives better prediction while used direction loss with $L_2$ regularization and per frame MSE loss. Using direction loss helps to achieve faster convergence of the landmark prediction network of the present disclosure. Use of DeepSpeech features helps the method of the present disclosure to achieve robustness in lip synchronization even for audios with noise, different accents, and different languages. Robustness of the I-GAN with different levels of noise was evaluated by adding synthetic noise in audio input. FIG. 7C shows up to −30 dB, the lip motion does not get affected by the noise and starts degrading afterwards.

Figure 8:
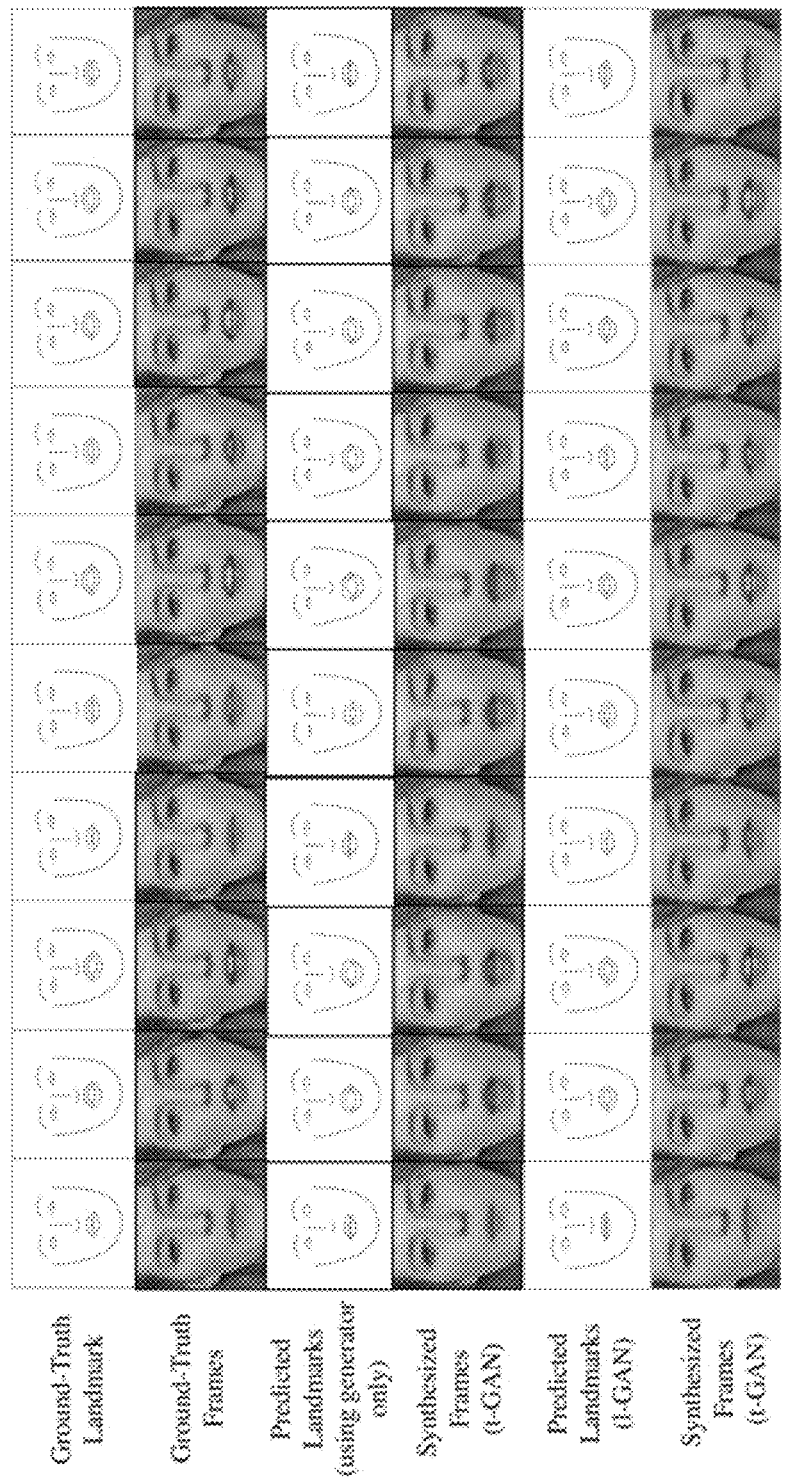
FIG. 8 depicts performance comparison of I-GAN using only generator (third row) and the complete GAN (fifth row), in accordance with an example embodiment of the present disclosure.

In FIG. 8, qualitative result of landmark generation network on TCD-TIMIT dataset are presented. More specifically, FIG. 8, with reference to FIGS. 2 through 7C, depicts performance comparison of I-GAN using only generator (third row) and the complete GAN (fifth row), in accordance with an example embodiment of the present disclosure. It shows the effectiveness of using discriminator in I-GAN. As can be observed in FIG. 8, the regression-based approach cannot capture the finer details like "a" and "o" of lip motion without the help of the discriminator. Whereas, in the present disclosure, since the one or more finer deformations of lips are predicted by the first generative adversarial network (FGAN), the one or more finer deformations of lips are indicative of a difference between pronunciation of two or more letters in one or more words comprised in the audio speech as described in step 206 of FIG. 2.

Experimental Results:

Experiment results for the texture generation from person-specific landmark motion are presented.

Network Architecture of t-GAN: A similar approach of an image-to-image translation method proposed by Johnson et al. has been adapted by the system and method of the present disclosure for implementation of the texture generator $G_T$ (e.g., the second GAN). The landmark encoder-decoder network $E_L$ of the present disclosure takes generated person-specific landmarks represented as images of size of size $\mathbb{R}^{3 \times 256 \times 256}$ and $E_I$ takes channel wise concatenated face images with corresponding landmark images of the target subject. The system and method of the present disclosure used six downsampling layers for both $E_I$ and the encoder of $E_L$ and six upsampling layers for the decoder of the $E_L$. To generate high-fidelity images, residual block was used for downsampling and upsampling layers similar to approach known in the art (e.g., refer 'Brock, A., Donahue, J., Simonyan, K.: Large scale gan training for high-fidelity natural image synthesis. arXiv preprint arXiv:1809.11096

(2018)'—also referred as Brock et al.). Instance normalization was used for the residual blocks and adaptive instance normalization on the bottle-neck layer of the $E_L$ using the activation produced by the last layer of $E_I$. Moreover, to generate sharper images, a method similar to a self-attention method as known in the art (e.g., refer 'Zhang, H., Goodfellow, I., Metaxas, D., Odena, A.: Self-attention generative adversarial networks. arXiv preprint arXiv:1805.08318 (2018)'—also referred as Zhang et al.) at the 32×32 layer activation of downsampling and upsampling layers. The discriminator network $D_T$ as depicted in FIG. 3 consisted of 6 residual blocks similar to $E_I$, followed by a max pooling and a fully connected layer. In other words, the meta-learning texture comprises a plurality of high-fidelity images (sharper images). A plurality of individual pixels of the plurality of high-fidelity images are generated using a neighborhood feature of an output of an intermediary layer of the SGAN, in one example embodiment. To stabilize the GAN training, spectral normalization as known in the art (e.g., refer 'Miyato, T., Kataoka, T., Koyama, M., Yoshida, Y.: Spectral normalization for generative adversarial networks. arXiv preprint arXiv:1802.05957 (2018)'—also referred as Miyato et al.) was used for both generator and discriminator network.

Training and Testing Details:

The second GAN (t-GAN) was meta-trained using ground-truth landmarks following the teacher forcing strategy. Fixed step size as known in the art (refer Finn et al.) of 1e-3 and Adam as the meta-optimizer (refer Finn et al.) with learning rate 1e-4 were used. The values of $\alpha_1$, $\alpha_2$, $\lambda_{pix}$, $\lambda_{adv}$ and $\lambda_{feat}$ and are experimentally set to 1 e-1, 0.5, 1.0, and 0.3. At test time, 5 images of the target identity were used, and the person-specific landmark generated by the I-GAN were used to produce the output images. Before testing, a fine-tuning of the meta-trained network was performed using 20 images of the target person and the corresponding ground-truth landmarks extracted using OpenFace and face segmentation. A clustered GPU of NVIDIA Tesla V100 was used for meta-training and Quadro P5000 for fine-tuning the meta-learning network.

Quantitative Results:

Comparative performance of the GAN-based texture generation network of the present disclosure with the most recent state-of-the-art methods Chen et al., Zhou et al., and Vougioukas et al. have been presented. Similar to I-GAN, the t-GAN was trained on TCD-TIMIT and evaluated on the test split of GRID, TCD-TIMIT and the unknown subjects. Performance metrices PSNR, SSIM (structural similarity), CPBD (cumulative probability blur detection) (e.g., refer 'Narvekar, N. D., Karam, L. J.: A no-reference perceptual image sharpness metric based on a cumulative probability of blur detection. In: 2009 International Workshop on Quality of Multimedia Experience. pp. 87{91. IEEE (2009)'—also referred as Narvekar et al.), ACD (Average Content Distance) (e.g., refer Vougioukas, K., Petridis, S., Pantic, M.: Realistic speech-driven facial animation with gans. arXiv preprint arXiv:1906.06337 (2019)'—also referred as Vougioukas et al.) and similarity between FaceNet (e.g., refer Schroff et al.) features for reference identity image (1st frame of ground truth video) and predicted frames. Table 1 and 2 show that our method outperforms the state-of-the-art methods for all the datasets indicating better image quality. Due to inaccessibility of LRW dataset (e.g., Chung et al.), the texture generation method of the present disclosure was evaluated on Voxceleb dataset (e.g., refer 'Nagrani, A., Chung, J. S., Zisserman, A.: Voxceleb: a large-scale speaker identification dataset. arXiv preprint arXiv:1706.08612 (2017)'—also referred as Nagrani et al.) which gives average PSNR, SSIM and CPBD of 25.2, 0.63, and 0.11, respectively.

Figure 9A:
FIGS. 9A-9C depict qualitative comparison of the method of the present disclosure with the recent state-of-the-art methods on TCD-TIMIT dataset (upper 10 rows) and GRID dataset (lower 5 rows), in accordance with an example embodiment of the present disclosure.
Figure 9B:
Figure 9C:

Qualitative Results:

FIGS. 9A through 9C shows qualitative comparison against Chen et al, Zhou et al. and Vougioukas et al. More specifically, FIGS. 9A-9C, with reference to FIGS. 2 through 8, depict qualitative comparison of the method of the present disclosure with the recent state-of-the-art methods on TCD-TIMIT dataset (upper 10 rows) and GRID dataset (lower 5 rows), in accordance with an example embodiment of the present disclosure. The results of the present disclosure indicate improved identity preservation of the subject, good lip synchronization, detailed texture (such as teeth), lesser blur, and presence of randomly introduced eye blinks. It can be seen that Vougioukas et al., and Zhou et al. fail to preserve the identity of the test subject over frames in the synthesized video. Although Chen et al. can preserve the identity, there is a significant blur, especially around the mouth region. Also, it lacks any natural movements over face except lip or jaw motion yielding an unrealistic face animation. On the other hand, the method of the present disclosure can synthesize high-fidelity images (256×256) with preserved identity and natural eye motions.

Figure 10:
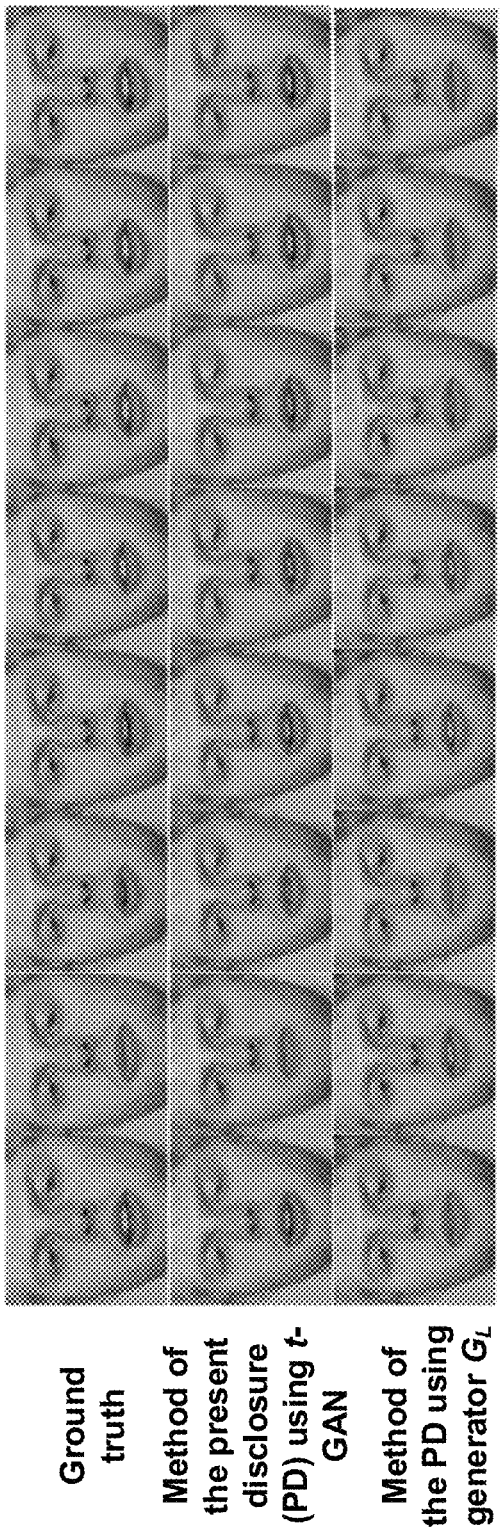
FIG. 10 depicts qualitative comparison between the t-GAN based method (Row 2) against the regression-based generator $G_L$ (Row 3) method, in accordance with an example embodiment of the present disclosure.

FIG. 10 shows the qualitative comparison of the GAN based texture generation against a regression based (without discriminator) network output where it is evident that our GAN based network gives more accurate lip deformation with similar motion as ground-truth. More specifically, FIG. 10, with reference to FIGS. 2 through 9, depicts qualitative comparison between the t-GAN based method (Row 2) against the regression-based generator $G_L$ (Row 3) method, in accordance with an example embodiment of the present disclosure.

User Study:

Realism of the animation produced by the system 100 has been assessed through a user study, where 25 users were asked to rate between 1(fake)-10(real) for 30 (10 videos from each of the methods mentioned in Table 3) synthesized videos randomly selected from TCD-TIMIT and GRID. The method of the present disclosure achieves better realism score compared to state-of-the-art methods.

TABLE 3

Comparative results for realism score (%) reported from user study.

| Method of the present disclosure | Chen et al. (prior art) | Vougioukas et al. (prior art) |
|---|---|---|
| 72.76 | 58.48 | 61.29 |

Figure 11:
FIG. 11 depicts ablation study for number of images during fine-tuning, in accordance with an example embodiment of the present disclosure.

Ablation Study:

The present disclosure further shows a detail ablation study on the TCD-TIMIT dataset to find out the effect of different losses. Among Channel-wise concatenation (CC) and adaptive instance normalization (ADIN), which are the two different approaches in neural style transfer, adaptive instance normalization works better for the problem described in the present disclosure as shown in Table 4. FIG. 10 shows that GAN based method produces more accurate lip deformation than the regression-based method which always produces overly smooth outcome. It is also supported by the quantitative result shown in Table 4. FIG. 11 shows the ablation study for the number of images required for fine-tuning on GRID dataset. More specifically, FIG. 11, with reference to FIGS. 2 through 10, depicts ablation study for number of images during fine-tuning, in accordance with an example embodiment of the present disclosure. Table 5 shows the method of the present disclosure can produce accurate motion and texture after 10 epochs of fine-tuning with K=20 sample images.

TABLE 4

| Methods | PSNR | SSIM | CPBD | LMD |
|---|---|---|---|---|
| Model + CC + $L_{pix}$ | 27.2 | 0.62 | 0.51 | 1.65 |
| Model + ADIN + $L_{pix}$ | 28.3 | 0.66 | 0.56 | 1.57 |
| Model + ADIN + $L_{pix}$ + $L_{feat}$ | 28.9 | 0.70 | 0.58 | 1.5 |
| Model + ADIN + $L_{pix}$ + $L_{feat}$ + $L_{adv}$ | 30.7 | 0.74 | 0.61 | 1.4 |

TABLE 5

| Dataset | Epochs | PSNR | SSIM | CPBD | LMD |
|---|---|---|---|---|---|
| GRID | 1 | 21.5 | 0.58 | 0.04 | 6.70 |
|  | 5 | 27.3 | 0.76 | 0.08 | 1.47 |
|  | 10 | 29.8 | 0.83 | 0.29 | 1.22 |
| TCD-TIMIT | 1 | 20.6 | 0.59 | 0.38 | 7.80 |
|  | 5 | 28.1 | 0.70 | 0.58 | 1.64 |
|  | 10 | 30.7 | 0.74 | 0.61 | 1.4 |

Figure 12:
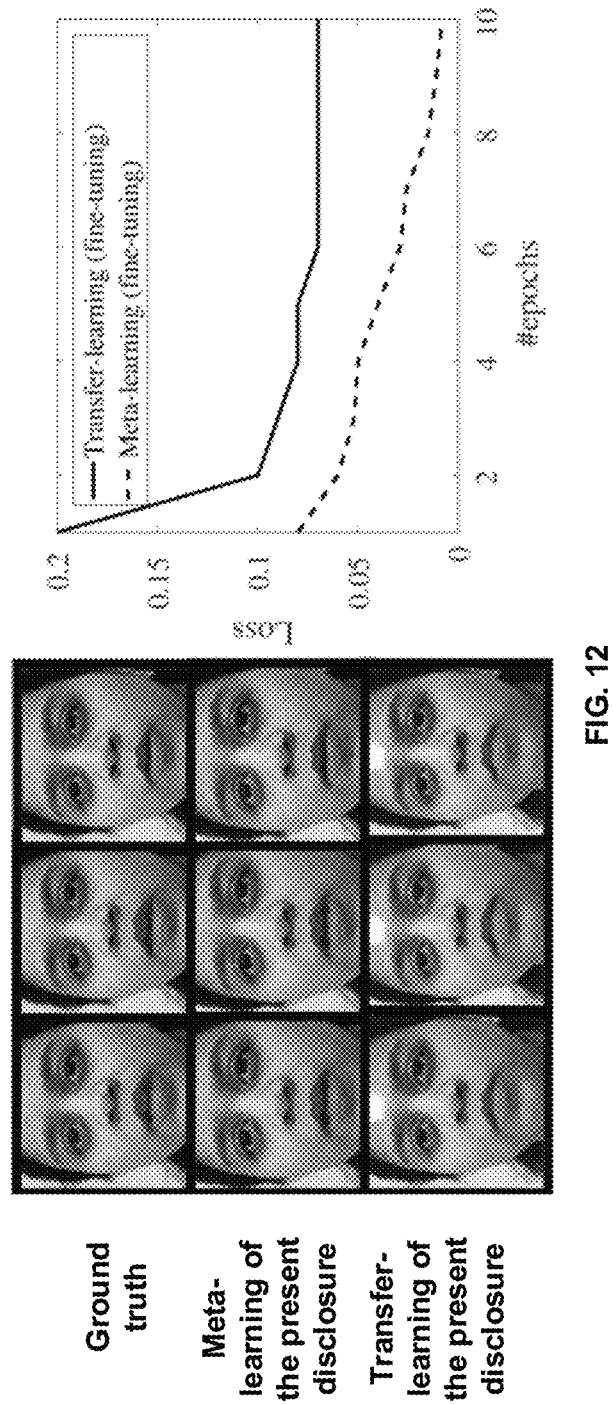
FIG. 12 depicts comparison between the fine-tuning stage of meta-learning and transfer-learning as implemented by the system of FIG. 2, in accordance with an example embodiment of the present disclosure.

Meta-Learning Vs. Transfer-Learning:

Performance of MAML (e.g., refer Finn et al.) and transfer-learning for the problem described in the present disclosure have been compared. To this end, a model was trained with the same model architecture until it converges to similar loss values as meta-learning. The graph in FIG. 12 shows that after 10 epochs of fine-tuning with 20 images, the loss of meta-learning is much lower than the transfer-learning (fine-tuning). More specifically, FIG. 12, with reference to FIGS. 2 through 11, depicts comparison between the fine-tuning stage of meta-learning and transfer-learning as implemented by the system 100 of FIG. 2, in accordance with an example embodiment of the present disclosure. It is observed from the graphical representation depicted in FIG. 12 that meta-learning provides better initialization than the transfer-learning.

Figure 13:
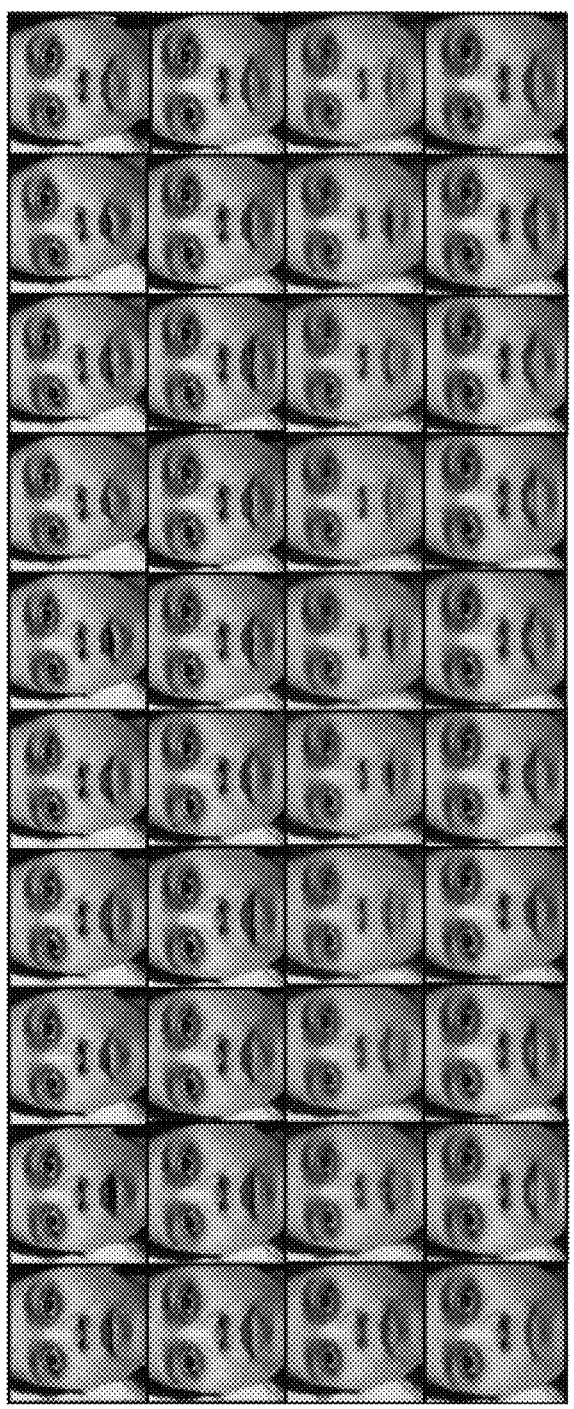
FIG. 13 depicts a comparison of the generated facial texture and mouth shapes generated by the method of the present disclosure with that speech-driven facial animation of state-of-the-art-methods, in accordance with an embodiment of the present disclosure.

FIG. 13 depicts a comparison of the generated facial texture and mouth shapes generated by the method of the present disclosure with that speech-driven facial animation of state-of-the-art-methods, in accordance with an embodiment of the present disclosure. More specifically, it can be observed from FIG. 13 that for speech-driven facial animation the state-of-the-art-methods (e.g., Chen et al., and Vougioukas et al.) fail to capture accurately the mouth shapes and detailed facial texture on an unknown test subject whose facial characteristics differ from the training data. The state-of-the-art methods of Chen et al. and Vougioukas et al. were evaluated using their publicly available pre-trained models trained on LRW and TCD-TIMIT datasets respectively. In these methods, the generated face can appear to be very different from the target identity (e.g., refer output of Vougioukas et al.) and there can be significant blur in the mouth region (e.g., refer output of Chen et al.), leading to unrealistic face animation. On the other hand, the generated facial texture and mouth shapes can accurately resemble the ground-truth animation sequence.

Embodiments of the present disclosure provide systems and methods for speech driven facial animation using the cascaded GAN comprised in the system 100 of FIG. 2. The method produces realistic facial animation for unknown subjects with different languages and accent in speech showing generalization capability. This advantage of the present disclosure is attributed due to the separate learning of motion and texture generator GANs with meta-learning capability. As a combined result, the method and system of the present disclosure outperform state-of-the-art methods/systems significantly.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for generating audio-speech driven animated talking face using a cascaded generative adversarial network, the method comprising:
    obtaining, via one or more hardware processors, an audio speech and a set of identity images (SI) of a target individual;
    extracting, via the one or more hardware processors, one or more DeepSpeech features of the target individual from the audio speech;
    generating, using the extracted DeepSpeech features, via a first generative adversarial network (FGAN) of a cascaded GAN executed by the one or more hardware processors, a speech-induced motion (SIM) on a sparse representation (SR) of a neutral mean face, wherein the SR of the SIM comprises a plurality of facial landmark points with one or more finer deformations of lips;
    generating, via the one or more hardware processors, a plurality of eye blink movements from random noise input learnt from a video dataset, wherein the plurality of eye blink movements are generated for each eye based on a sequence of generated displacements of associated facial landmark points of each eye region, and wherein the plurality of eye blink movements comprise a set of eye landmark points with blink motion;
    replacing one or more eye landmark points of the plurality of facial landmark points with the set of eye landmark points with blink motion to obtain a set of final landmark points, the set of final landmark points comprises (i) the set of eye landmark points with blink motion and (ii) one or more landmark points containing the speech-induced motion;
    generating, via the one or more hardware processors one or more target-specific landmark points (TSLP) based on (i) the set of final landmark points (FLP) and (ii) an identity landmark obtained from the set of identity images;
    determining at least one face type as one of a pre-stored face image or a new face image using the set of identity images; and
    performing, via a second generative adversarial network (SGAN) of the cascaded GAN executed by the one or more hardware processors, based on the at least one determined face type, one of:
        fine-tuning a meta-trained network (MN) using the set of identity images (SI) and the plurality of facial landmark points extracted from the set of identity images (SI) for the target individual to obtain a fine-tuned meta-trained network (FTMTN) and generating, using the one or more target-specific landmark points (TSLP), a meta-learning-based texture (MLT) via the FTMTN thereof; or
        generating a meta-learning-based texture (MLT) using the set of identity images (SI) and the one or more target-specific landmark points (TSLP), via a pre-generated fine-tuned meta-trained network (FTMTN), wherein the generated MLT serves as an animated talking face of the target individual.

2. The processor implemented method of claim 1, wherein the one or more finer deformations of lips are predicted by the first generative adversarial network (FGAN), and wherein the one or more finer deformations of lips are indicative of a difference between pronunciation of two or more letters in one or more words comprised in the audio speech.

3. The processor implemented method of claim 1, wherein the meta-learning texture comprises a plurality of high-fidelity images, and wherein a plurality of individual pixels of the plurality of high-fidelity images are generated using a neighborhood feature of an output of an intermediary layer of the SGAN.

4. The processor implemented method of claim 1, wherein the speech induced motion is learnt based on (i) a direction of movement of the plurality facial landmark points, (ii) an adversarial loss used for training the FGAN, (iii) a temporal smoothness loss in the plurality facial landmark points, and (iv) a distance loss between one or more predicted facial landmark points and one or more ground-truth facial landmark points.

5. A system, comprising:
    a memory storing instructions;
    one or more communication interfaces; and
    one or more hardware processors coupled to the memory via the one or more communication interfaces, wherein the one or more hardware processors are configured by the instructions to:
    obtain an audio speech and a set of identity images (SI) of a target individual;
    extracting one or more DeepSpeech features of the target individual from the audio speech;
    generate, using the extracted DeepSpeech features, via a first generative adversarial network (FGAN) of a cascaded GAN comprised in the memory (102), a speech-induced motion (SIM) on a sparse representation (SR) of a neutral mean face, wherein the SR of the SIM comprises a plurality of facial landmark points with one or more finer deformations of lips;
    generate a plurality of eye blink movements from random noise input learnt from a video dataset, wherein the plurality of eye blink movements are generated for each eye based on a sequence of generated displacements of associated facial landmark points of each eye region, and wherein the plurality of eye blink movements comprise a set of eye landmark points with blink motion;
    replace one or more eye landmark points of the plurality of facial landmark points with the set of eye landmark points with blink motion to obtain a set of final landmark points, the set of final landmark points comprises (i) the set of eye landmark points with blink motion and (ii) one or more landmark points containing the speech-induced motion;

generate one or more target-specific landmark points (TSLP) based on (i) the set of final landmark points (FLP) and (ii) an identity landmark obtained from the set of identity images;

determine at least one face type as one of a pre-stored face image or a new face image using the set of identity images; and perform, via a second generative adversarial network (SGAN) of the cascaded GAN executed by the one or more hardware processors, based on the at least one determined face type, one of:

fine-tuning a meta-trained network (MN) using the set of identity images (SI) and the plurality of facial landmark points extracted from the set of identity images (SI) for the target individual to obtain a fine-tuned meta-trained network (FTMTN) and generating, using the one or more target-specific landmark points (TSLP), a meta-learning-based texture (MLT) via the FTMTN thereof; or generating a meta-learning-based texture (MLT) using the set of identity images (SI) and the one or more target-specific landmark points (TSLP), via a pre-generated fine-tuned meta-trained network (FTMTN), wherein the generated MLT serves as an animated talking face of the target individual.

6. The system of claim 5, wherein the one or more finer deformations of lips are predicted by the first generative adversarial network (FGAN), and wherein the one or more finer deformations of lips are indicative of a difference between pronunciation of two or more letters in one or more words comprised in the audio speech.

7. The system of claim 5, wherein the meta-learning texture comprises a plurality of high-fidelity images, and wherein a plurality of individual pixels of the plurality of high-fidelity images are generated using a neighborhood feature of an output of an intermediary layer of the SGAN.

8. The system of claim 5, wherein the speech induced motion is learnt based on (i) a direction of movement of the plurality facial landmark points, (ii) an adversarial loss used for training the FGAN, (iii) a temporal smoothness loss in the plurality facial landmark points, and (iv) a distance loss between one or more predicted facial landmark points and one or more ground-truth facial landmark points.

9. A computer program product comprising a non-transitory computer readable medium having a computer readable program embodied therein, wherein the computer readable program, when executed on a computing device causes the computing device to generate audio-speech driven animated talking face using a cascaded generative adversarial network by obtaining, via one or more hardware processors, an audio speech and a set of identity images of a target individual;

extracting, via the one or more hardware processors, one or more DeepSpeech features of the target individual from the audio speech;

generating, using the extracted DeepSpeech features, via a first generative adversarial network (FGAN) of the cascaded GAN executed by the one or more hardware processors, a speech-induced motion (SIM) on a sparse representation (SR) of a neutral mean face, wherein the SR of the SIM comprises a plurality of facial landmark points with one or more finer deformations of lips;

generating, via the one or more hardware processors, a plurality of eye blink movements from random noise input learnt from a video dataset, wherein the plurality of eye blink movements are generated for each eye based on a sequence of generated displacements of associated facial landmark points of each eye region, and wherein the plurality of eye blink movements comprise a set of eye landmark points with blink motion;

replacing one or more eye landmark points of the plurality of facial landmark points with the set of eye landmark points with blink motion to obtain a set of final landmark points, the set of final landmark points comprises (i) the set of eye landmark points with blink motion and (ii) one or more landmark points containing the speech-induced motion;

generating, via the one or more hardware processors one or more target-specific landmark points (TSLP) based on (i) the set of final landmark points (FLP) and (ii) an identity landmark obtained from the set of identity images;

determining at least one face type as one of a pre-stored face image or a new face image using the set of identity images; and performing, via a second generative adversarial network (SGAN) of the cascaded GAN executed by the one or more hardware processors, based on the at least one determined face type, one of:

fine-tuning a meta-trained network (MN) using the set of identity images (SI) and the plurality of facial landmark points extracted from the SI for the target individual to obtain a fine-tuned meta-trained network (FTMTN) and generating, using the one or more target-specific landmark points (TSLP), a meta-learning texture (MLT) via the FTMTN thereof; or generating a meta-learning texture (MLT) using the SI and the one or more target-specific landmark points (TSLP), via a pre-generated fine-tuned meta-trained network (FTMTN), the generated MLT serves as an animated talking face of the target individual.

10. The computer program product of claim 9, wherein the one or more finer deformations of lips are predicted by the first generative adversarial network (FGAN), and wherein the one or more finer deformations of lips are indicative of a difference between pronunciation of two or more letters in one or more words comprised in the audio speech.

11. The computer program product of claim 9, wherein the meta-learning texture comprises a plurality of high-fidelity images, and wherein a plurality of individual pixels of the plurality of high-fidelity images are generated using a neighborhood feature of an output of an intermediary layer of the SGAN.

12. The computer program product of claim 9, wherein the speech induced motion is learnt based on (i) a direction of movement of the plurality facial landmark points, (ii) an adversarial loss used for training the FGAN, (iii) a temporal smoothness loss in the plurality facial landmark points, and (iv) a distance loss between one or more predicted facial landmark points and one or more ground-truth facial landmark points.

* * * * *